(12) United States Patent
Kamins

(10) Patent No.: US 10,293,206 B2
(45) Date of Patent: *May 21, 2019

(54) STOWABLE LOWER BODY FITNESS APPARATUS PROVIDING ENHANCED MUSCLE ENGAGEMENT, BODY STABILITY AND RANGE OF MOTION

(71) Applicant: Paul Kamins, Lancaster, NH (US)

(72) Inventor: Paul Kamins, Lancaster, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,575

(22) Filed: Jun. 15, 2016

(65) Prior Publication Data

US 2016/0296785 A1    Oct. 13, 2016

Related U.S. Application Data

(63) Continuation-in-part of application No. 14/876,810, filed on Oct. 6, 2015, which is a continuation-in-part of application No. 14/876,811, filed on Oct. 6, 2015.
(Continued)

(51) Int. Cl.
*A63B 23/04*    (2006.01)
*A63B 21/062*    (2006.01)
(Continued)

(52) U.S. Cl.
CPC .... *A63B 23/0482* (2013.01); *A63B 21/00069* (2013.01); *A63B 21/00181* (2013.01); *A63B 21/0552* (2013.01); *A63B 21/062* (2013.01); *A63B 21/0628* (2015.10); *A63B 21/154* (2013.01); *A63B 21/156* (2013.01);
(Continued)

(58) Field of Classification Search
CPC ....... A63B 21/154; A63B 21/02; A63B 21/04; A63B 21/0442; A63B 21/0617; A63B 21/4011; A63B 21/4013; A63B 21/4015; A63B 21/156; A63B 21/062; A63B 21/0622; A63B 21/0624; A63B 21/0628;
(Continued)

(56) References Cited

U.S. PATENT DOCUMENTS 804,218 A  *  11/1905  Fiedler ............... A63B 21/0628
                                                        482/102
3,428,312 A       2/1969  Machen
(Continued)

*Primary Examiner* — Nyca T Nguyen
(74) *Attorney, Agent, or Firm* — Joseph Aufiero

(57) ABSTRACT

A collapsible lower body fitness apparatus is disclosed, providing enhanced gluteal muscle engagement, body stability, and range of motion. The apparatus includes a base, a frame, a line-swiveling assembly, and a gripping device that is horizontally displaced from the line-swiveling assembly's swivel axis, allowing a user to stabilize themselves in tripod posture during exercise. Thus a user can perform full range of motion for any combination of hip extension and hip abduction under resistance transmitted by a line, all from a central standing position that substantially straddles the swivel axis. This functional framework of elements can be realized through a variety of possible embodiments. While the frame provides space for leaning during exercise, it may otherwise vary in structural design. In all cases, the frame can be collapsed into a stowable position that is substantially parallel with and adjacent to the base, thereby rendering the apparatus portable and stowable.

19 Claims, 26 Drawing Sheets

Related U.S. Application Data

(60) Provisional application No. 62/060,556, filed on Oct. 6, 2014, provisional application No. 62/060,556, filed on Oct. 6, 2014.

(51) Int. Cl.
 *A63B 21/00*  (2006.01)
 *A63B 23/035*  (2006.01)
 *F16B 7/10*  (2006.01)
 *A63B 21/055*  (2006.01)
 *A63B 21/04*  (2006.01)
 *A63B 69/00*  (2006.01)
 *A63B 21/06*  (2006.01)
 *A63B 26/00*  (2006.01)
 *A63B 71/02*  (2006.01)

(52) U.S. Cl.
 CPC ...... *A63B 21/4013* (2015.10); *A63B 21/4015* (2015.10); *A63B 21/4034* (2015.10); *A63B 23/03508* (2013.01); *A63B 23/0488* (2013.01); *F16B 7/10* (2013.01); *A63B 21/00072* (2013.01); *A63B 21/0442* (2013.01); *A63B 21/0557* (2013.01); *A63B 21/0602* (2013.01); *A63B 21/151* (2013.01); *A63B 21/4035* (2015.10); *A63B 21/4043* (2015.10); *A63B 23/03541* (2013.01); *A63B 26/003* (2013.01); *A63B 69/0057* (2013.01); *A63B 2071/027* (2013.01); *A63B 2208/0204* (2013.01); *A63B 2208/0209* (2013.01); *A63B 2210/50* (2013.01)

(58) Field of Classification Search
 CPC ....... A63B 21/15; A63B 21/159; A63B 21/08; A63B 23/0482; A63B 23/0488
 See application file for complete search history.

(56) References Cited

U.S. PATENT DOCUMENTS

| | | | | |
|---|---|---|---|---|
| 3,708,167 A * | 1/1973 | Potgieter | ............ | A63B 21/0615 482/100 |
| 3,861,675 A * | 1/1975 | Hopper | ............ | A63B 69/12 482/55 |
| 4,749,189 A * | 6/1988 | Frank | ............ | A63B 21/023 482/129 |
| 4,781,374 A * | 11/1988 | Lederman | ............ | A63B 21/06 482/103 |
| 4,826,153 A * | 5/1989 | Schalip | ............ | A63B 21/06 482/94 |
| 5,405,306 A * | 4/1995 | Goldsmith | ............ | A61H 1/0237 482/110 |
| 5,842,961 A * | 12/1998 | Davis | ............ | A63B 23/00 482/102 |
| 6,004,248 A * | 12/1999 | Price | ............ | A63B 21/055 482/121 |
| 7,137,935 B2 | 11/2006 | Clarke | | |
| 7,169,096 B1 * | 1/2007 | Vittone | ............ | A63B 21/4011 482/140 |
| 7,470,221 B1 * | 12/2008 | Ramos | ............ | A63B 21/154 482/100 |
| 7,682,298 B2 | 3/2010 | Croft | | |
| 8,608,479 B2 * | 12/2013 | Liu | ............ | A61H 1/024 434/255 |
| 8,876,675 B2 * | 11/2014 | Califano | ............ | A63B 21/4015 482/121 |
| 8,968,167 B1 * | 3/2015 | Abelbeck | ............ | A63B 21/0442 482/129 |
| 2002/0016238 A1 * | 2/2002 | Roy | ............ | A63B 21/063 482/94 |
| 2003/0069112 A1 * | 4/2003 | Williams | ............ | A63B 21/154 482/101 |
| 2005/0043150 A1 * | 2/2005 | Nitta | ............ | A63B 21/026 482/79 |
| 2005/0130814 A1 * | 6/2005 | Nitta | ............ | A63B 1/00 482/121 |
| 2006/0128536 A1 * | 6/2006 | Herrington | ............ | A63B 21/0628 482/94 |
| 2006/0135329 A1 * | 6/2006 | Owen | ............ | A63B 21/04 482/123 |
| 2009/0105052 A1 * | 4/2009 | Dalebout | ............ | A63B 21/06 482/133 |
| 2012/0035024 A1 * | 2/2012 | Price | ............ | A63B 21/00072 482/92 |

* cited by examiner

EXTENSION

THE 45°

ABDUCTION

ADDUCTION

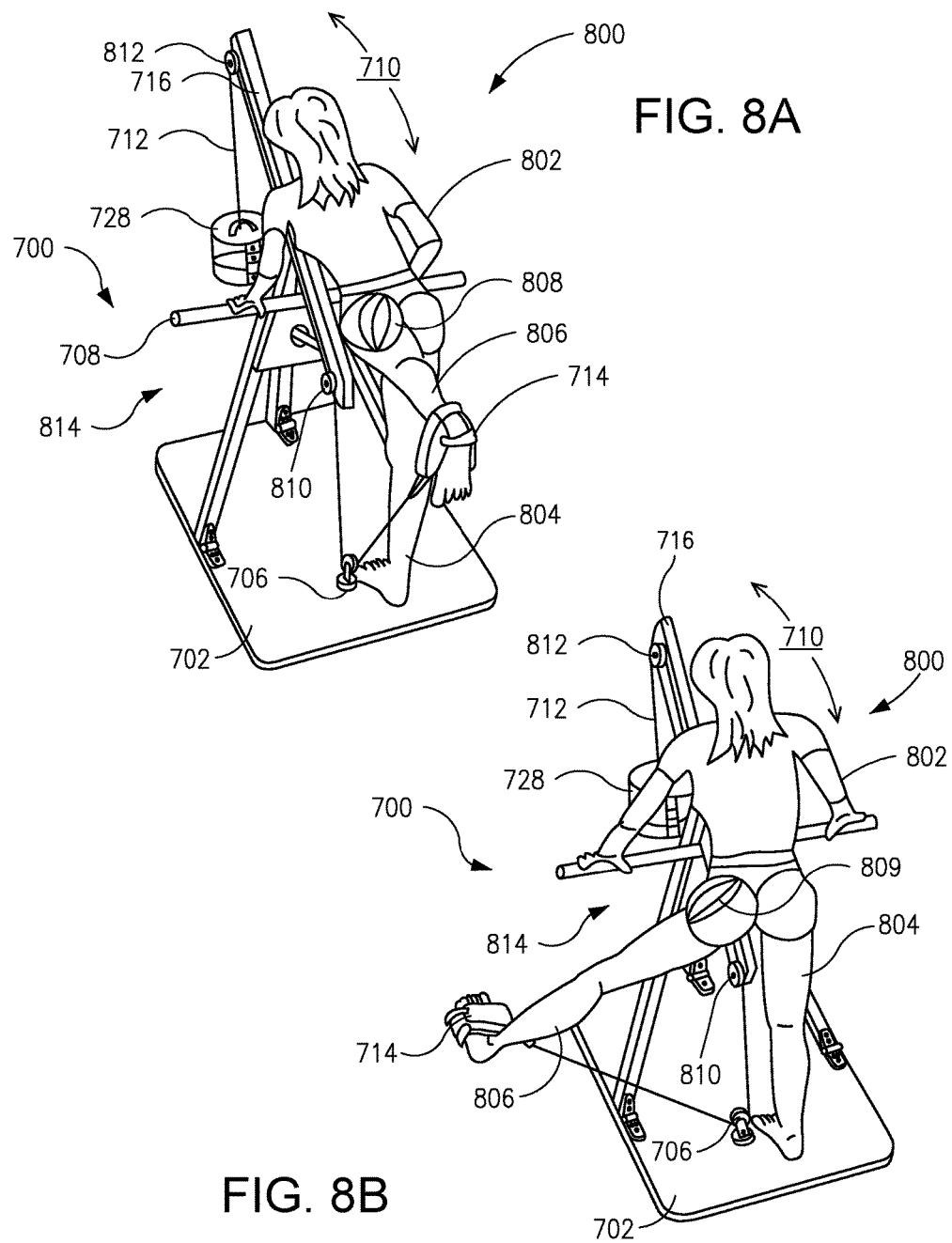

STOWABLE LOWER BODY FITNESS APPARATUS PROVIDING ENHANCED MUSCLE ENGAGEMENT, BODY STABILITY AND RANGE OF MOTION

CROSS-REFERENCE TO RELATED APPLICATIONS

This present application is a continuation-in-part of applicant's co-pending application Ser. No. 14/876,810, filed Oct. 6, 2015 and entitled "Stowable Lower Body Fitness Apparatus Providing Enhanced Muscle Engagement, Body Stability and Range of Motion," which itself claims the benefit of Provisional Application 62/060,556, filed Oct. 6, 2014—and the disclosure of application Ser. No. 14/876,810 is also hereby incorporated by reference in its entirety into the present application. The present application is also a continuation-in-part of applicant's co-pending application Ser. No. 14/876,811, filed Oct. 6, 2015 and entitled "Lower Extremity Receiving Device for Providing Enhanced Leg Mobility During Lower Body Exercise," which itself also claims the benefit of Provisional Application 62/060,556, filed Oct. 6, 2014—and the disclosure of application Ser. No. 14/876,811 is also hereby incorporated by reference in its entirety into the present application.

FIELD

This invention relates generally to fitness equipment, and more particularly to lower body fitness equipment.

BACKGROUND

In addition to being an integral part of an individual's overall fitness, toned and shapely buttocks and legs have also become desirable due to their perceived physical attractiveness. As a result, the market for lower body exercise machines and devices has grown in recent years, especially among women. Many such machines and devices are known in the art.

One class of exercise machine for the buttocks involves a resistance-transmitting line, such as a weight machine cable, coupled at a pullable end with a user's leg. Lower body fitness machines that are designed as cable machines can continuously transmit resistance during extension and/or abduction of the user's hip, which in turn can work the gluteal muscles and enhance sculpting of the buttocks.

But such machines can pose problems. In particular, it can be difficult for the user of a machine to fully engage all of their gluteal muscles. Furthermore, attempts to do so can compromise their posture, potentially leading to discomfort or even injury. Meanwhile, many fitness enthusiasts desire to exercise their buttocks at home, but they may prefer not to have to purchase expensive, bulky machinery for this purpose.

SUMMARY

Various embodiments of an improved stowable lower body fitness apparatus are disclosed, which provide enhanced gluteal muscle engagement, body stability and range of motion. Unlike other known machines for lower body exercise, the present invention safely and efficiently provides maximal engagement of all gluteal muscles, sparing the user from undue discomfort and/or wasted effort in the process.

The improved performance of the present invention is facilitated by the strategic placement of a compact line-swiveling assembly that enables a resistance-transmitting line to swivel about a vertical swivel axis. A gripping device is positioned relative to the swivel axis to allow for effective and even exercise of the entire buttocks, along with increased range of motion and continuous proper stability and body alignment.

By positioning the grip locus relative to the swivel axis in accordance with embodiments disclosed below, a new unanticipated synergistic effect is created which leads to optimal gluteal muscle exercise. From a single stance, the user can perform the full range of any combination of hip extension and/or hip abduction under resistance with either leg, easily switching from side to side, all while constantly stabilizing themselves in a balanced tripod posture.

Furthermore, the frame of this apparatus is capable of folding down into a state that is substantially parallel with and adjacent to the base, such that the apparatus can be stowed away to avoid wasting space when it is not in use. This enables home users to exercise their gluteal muscles with the highest efficiency possible, but without the need for large and costly equipment continuously taking up room in their home.

In one general aspect, a stowable lower body fitness apparatus is claimed, comprising: a base; a frame coupled to and supported by the base, the frame being capable of collapsing into a stowable position; a line-swiveling assembly coupled with the base, the line-swiveling assembly being configured to engage with a resistance-transmitting cable, to enable a pullable end of the cable to swivel about a vertical swivel axis to allow a user to pull the pullable end with an exercising leg to perform any combination of hip extension and hip abduction from a single standing position that substantially straddles that swivel axis; a gripping device connected to the frame, the gripping device including a plurality of grippable areas positioned along a substantially horizontal grip locus, the grip locus being sufficiently positioned relative to the swivel axis to allow the user to stabilize themselves in a tripod posture formed by both arms and a standing leg during the any combination of hip extension and hip abduction; and a leaning space passing through the swivel axis, the leaning space having sufficient volume to allow the user to lean their upper body to achieve full range of exercise motion during the any combination of hip extension and hip abduction.

In some embodiments, the stowable position is substantially adjacent to and substantially parallel with the base. In some embodiments, components of the apparatus are capable of folding relative to each other. In some embodiments, components of the apparatus are capable of being separated from each other. In some embodiments, components of the apparatus are capable of being locked into desired position relative to each other. In some embodiments, components of the apparatus can be telescoped relative to each other.

In some embodiments, stability of the apparatus during use is facilitated by body weight of the user on the base. In some embodiments, the apparatus is capable of being toted by a female user. In some embodiments, the apparatus is capable of being rolled while in its stowable position. In some embodiments, its stowable position has a sufficiently narrow profile as to be stowed under a bed.

In some embodiments, the frame includes a tripod support. In some embodiments, the frame includes a single vertical support post attached to the base near the line-swiveling assembly. In some embodiments, the frame includes a pair of vertical support posts, each post attached to a rear corner of the base. In some embodiments, the frame includes a T-shaped support that includes a mast and buttress wing. In some embodiments, the apparatus is capable of coupling with a resistance-generating element of a separate apparatus.

In another general aspect, a lower fitness body apparatus is claimed comprising a base; a frame coupled to and supported by the base, the frame being capable of collapsing into a stowable position; a swiveling pulley coupled with the base, the swiveling pulley being configured to engage with a resistance-transmitting cable, to enable a pullable end of the cable to swivel about a vertical swivel axis to allow a user to pull the pullable end with an exercising leg to perform full range of motion for any combination of hip extension and hip abduction under resistance from a single standing position that substantially straddles the swivel axis; a weightlifting pulley assembly coupled with the frame, the weightlifting pulley assembly being configured to engage with the cable to facilitate lifting of a liftable exercise weight when the pullable end is pulled with sufficient force; a gripping device connected to the frame, the gripping device including a plurality of grippable areas positioned along a substantially horizontal grip locus, the grip locus being sufficiently positioned relative to the swivel axis to allow the user to stabilize themselves in a tripod posture formed by both arms and a standing leg during the any combination of hip extension and hip abduction; and a leaning space passing through the swivel axis, the leaning space having sufficient volume to allow the user to lean their upper body to achieve full range of exercise motion during the any combination of hip extension and hip abduction.

In some embodiments, a container of water can serve as a liftable exercise weight. In still another general aspect, a lower fitness body apparatus is claimed comprising: a base; a frame coupled to and supported by the base, the frame being capable of collapsing into a stowable position; a swiveling pulley coupled with the base, the swiveling pulley being configured to engage with an resistance-transmitting cable, to enable a pullable end of the cable to swivel about a vertical swivel axis to allow a user to pull the pullable end with an exercising leg to perform full range of motion for any combination of hip extension and hip abduction under resistance from a single standing position that substantially straddles the swivel axis; a band-stretching pulley assembly coupled with the frame, the band-stretching pulley assembly being configured to engage with the cable to facilitate stretching of an elastic resistance band when the pullable end is pulled with sufficient force; a gripping device connected to the frame, the gripping device including a plurality of grippable areas positioned along a substantially horizontal grip locus, the grip locus being sufficiently positioned relative to the swivel axis to allow the user to stabilize themselves in a tripod posture formed by both arms and a standing leg during the any combination of hip extension and hip abduction; and a leaning space passing through the swivel axis, the leaning space having sufficient volume to allow the user to lean their upper body to achieve full range of exercise motion during the any combination of hip extension and hip abduction.

In some embodiments, the band-stretching pulley assembly is capable of producing compound elastic resistance. Some embodiments can include a mechanism for adjusting tension of an elastic resistance band.

BRIEF DESCRIPTION OF THE DRAWINGS

The invention will be more fully understood by reference to the detailed description, in conjunction with the following figures, wherein:

FIG. 1 is a front oblique view of an illustrative embodiment of the use-for-exercise aspect of the present invention;

FIG. 2 is a perspective view of a functional framework of the illustrative embodiment; and FIGS. 3-14 introduce exemplary machine embodiments of the invention, specifically:

FIG. 3 is a front oblique view of a possible commercial embodiment of the invention with a hinged mono-tube design;

FIG. 4 is a profile view of the embodiment of FIG. 3 being used to fully perform hip flexion;

FIG. 6 is a front oblique view of the embodiment of FIG. 3 with its frame fully collapsed into a stowable position;

FIG. 7 is a front oblique view of an embodiment of the invention with a three legged frame;

FIG. 8A is a front oblique view of the embodiment of FIG. 7 being used to perform hip extension;

FIG. 8B is a front oblique view of the embodiment of FIG. 7 being used to perform hip abduction;

FIG. 11O is a front oblique view of the embodiment of FIG. 11A with its frame fully collapsed in the stowable position;

DETAILED DESCRIPTION

The gluteal muscles are often considered the powerhouse of the body and an essential part of the body's "core," and as such, they are of central focus in strength training and physical fitness. Toning of the gluteal muscles also holds substantial aesthetic appeal, particularly for female physiques. However, traditional exercises for targeting the gluteal muscles require weightlifting in a variety of difficult and/or uncomfortable postures.

Given the growing desire among women to build their gluteal muscles, the demand for more ergonomic exercise equipment that can effectively target this area of the body has increased substantially. While some resistance-transmitting line machines seemingly offer comparatively comfortable gluteal workout routines, their perceived comfort actually comes at the expense of optimal gluteal muscle engagement.

The following detailed description corresponds with the accompanying drawings. First, the current inventive concept is explained by reference to a functional framework, and then various possible embodiments are taught and described. Of central importance is the ability of these embodiments to be collapsed into an easily stowable and portable state, by the folding of their frame down to be substantially parallel to and adjacent to their base.

Basic Functional Framework

Figure 1:
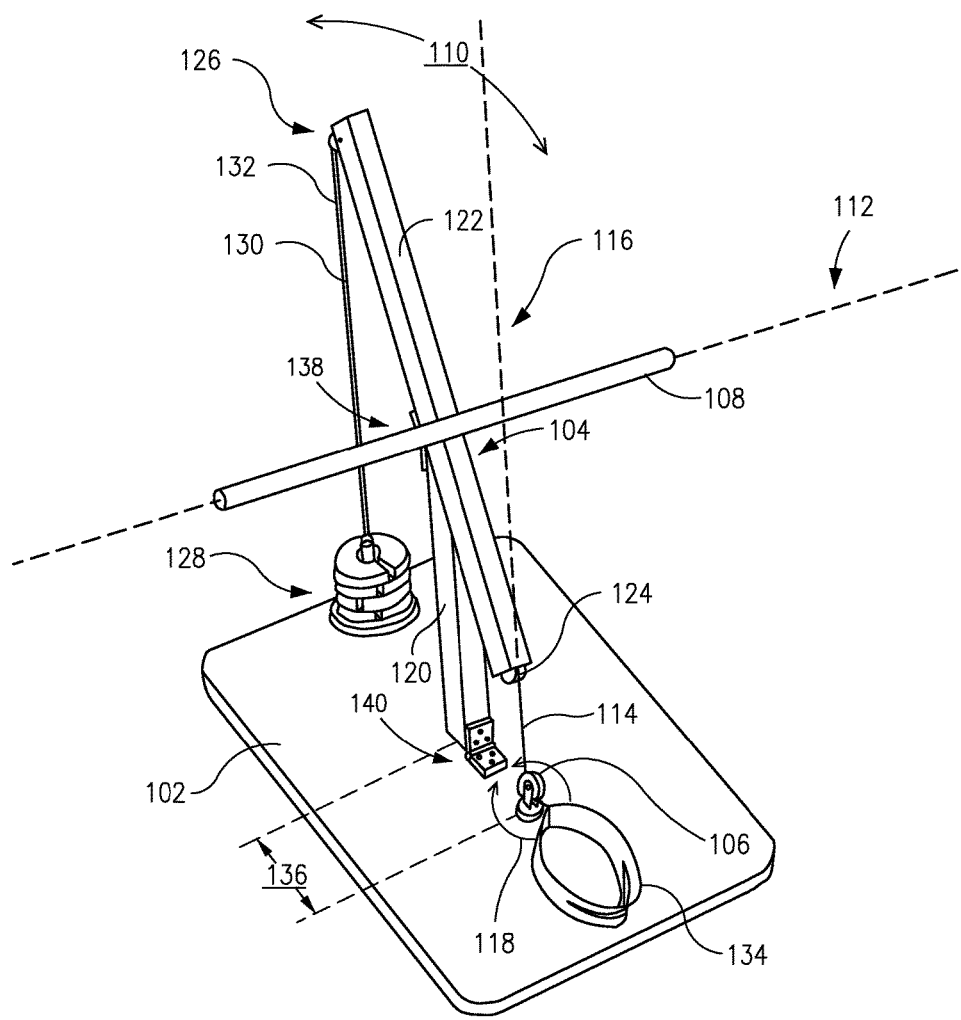
FIGS. 1-2 introduce an illustrative embodiment and basic functional framework of the invention, specifically.
Figure 2:
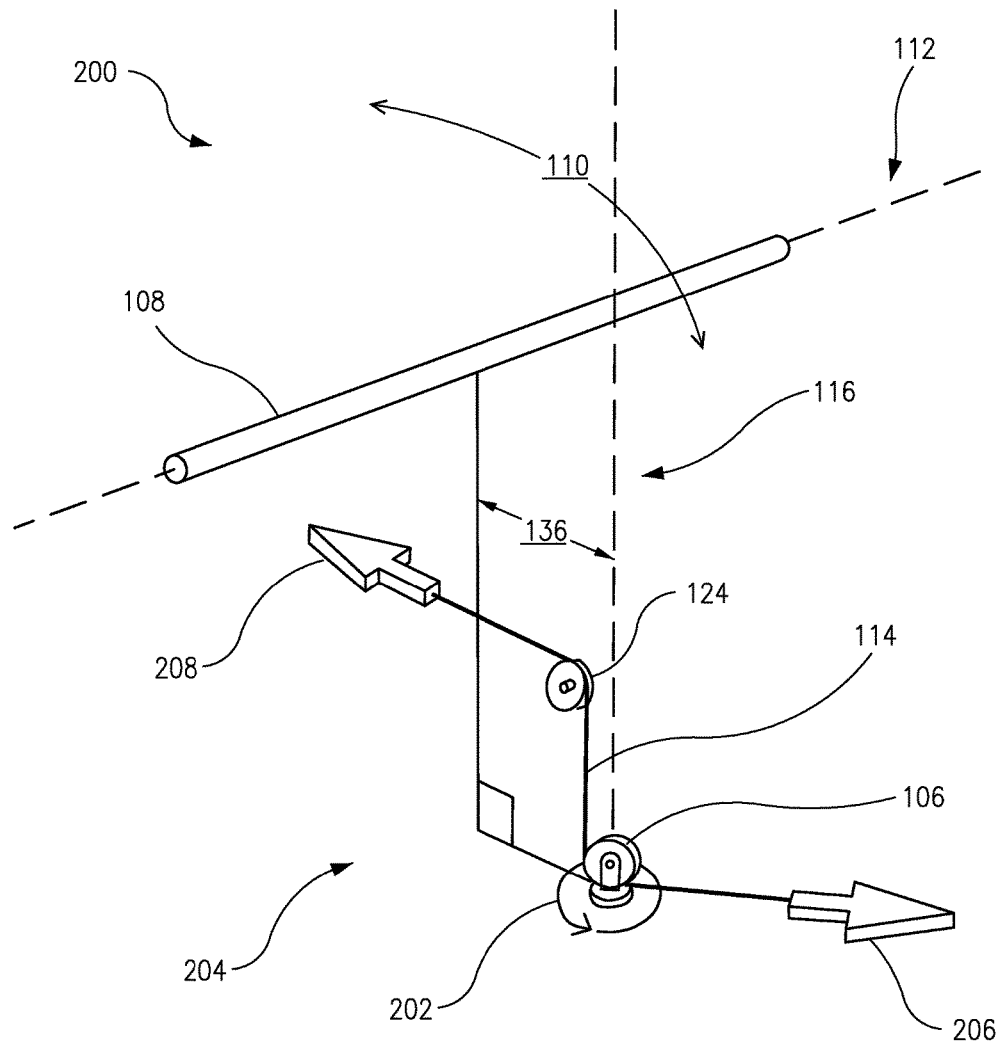

FIGS. 1-2 introduce an illustrative embodiment and basic functional framework of the invention, specifically: FIG. 1 is a front oblique view of an illustrative embodiment of the use-for-exercise aspect of the present invention; and FIG. 2 is a perspective view of a functional framework of the illustrative embodiment. These diagrammatic illustrations and explanations help lay groundwork for understanding the benefits of use of commercial embodiments taught here.

1

FIG. 1 is a front oblique view of an illustrative embodiment of the use-for-exercise aspect of the present invention. The embodiment shown 100 includes a base 102, a frame 104 attached to and supported by the base 102, a line-swiveling assembly 106 coupled with the base 102, a gripping device 108 connected to the frame 104, and a leaning space 110 that allows a user to lean their upper body for full range of exercise motion during any combination of hip extension and hip abduction, while under continuous resistance.

Important features of the present invention during use for exercise are highlighted in this graphically illustrative design 100. The combination of key structural elements and spatial relationships shown here can be rendered in many different possible embodiments. This embodiment 100 is shown mainly for illustrative purposes. It is a simple abstract representation of one of the most basic structurally feasible embodiments that supports a core functional objective of the invention. A "functional framework" for enabling this core objective is explicated further in connection with FIG. 2, below.

The functional framework is a functional arrangement of key elements which enable a user to achieve full range of motion for any combination of hip extension and hip abduction, all from a single stance. The key elements and their relative position to each other make up the functional framework, which is present in this illustrative embodiment 100 and is analyzed in isolation in FIG. 2. The functional framework can be manifest in many different structural designs, of which the embodiments shown, taught and described in relation to FIGS. 3-12 are but a few possibilities.

The single stance from which a user can perform all manner of hip extension and hip abduction exercises is a central stance that substantially straddles the swivel axis 116. For the purposes of discussion of the present invention, a user can be said to be substantially "straddling" the swivel axis 116 if they are standing with substantially one leg on either side of the swivel axis 116. From this single stance, any combination of hip extension and hip abduction can be properly performed, with full range of motion of either leg.

In this embodiment, the gripping device 108 includes a plurality of grippable areas positioned along a substantially horizontal grip locus 112, extended here for illustrative purposes. The grip locus 112 is the locus passing through all grippable areas, terminating at the outermost grippable areas. It is shown here as a grip axis, positioned relative to the line-swiveling assembly 106 to allow a user to lean forward during exercise to properly stabilize themselves through any combination of hip extension and hip abduction movements. In other embodiments, the grip locus 112 can be angled or curved instead of a straight axis.

The line-swiveling assembly 106 is configured to engage with a resistance-transmitting line 114 to enable a pullable end of the line to swivel about a vertical swivel axis 116, allowing a user to pull the pullable end with an exercising leg to perform full range of motion for any combination of hip extension and hip abduction under resistance, from a single standing position that substantially straddles the swivel axis 116. In this embodiment, an inelastic weight-bearing resistance cable is being used.

In this embodiment, the line-swiveling assembly 106 comprises a swiveling pulley that is free to swivel about a vertical swivel axis 116. Here the pulley 106 is attached directly to the base 102, but can also be attached to the frame 104 or other connecting structure. The line 114 is fed into the swiveling pulley 106 substantially vertically and perpendicular to the initial direction of pulling, which is what enables its pullable end to swivel freely about the swivel axis 116.

The swiveling pulley shown 106 is able to swivel in a full circle about the swivel axis 116, thereby allowing the pullable end of the line 114 to swivel along a swivel arc 118 about the swivel axis 116. The unobtrusive pulley 106 guides the pullable end in a swivel arc 118 of considerably tight radius, ensuring that a user can accomplish all hip motions from a single stance that substantially straddles the swivel axis 116, and under continued resistance through their entire range of motion.

From the line-swiveling assembly 106, the resistance-transmitting line 114 is then guided across the frame 104. In the embodiment shown, the frame 104 includes a vertical support post 120 attached to the base 102, and a diagonal boom 122 attached to and supported by the support post 120. The line 114 is guided along the inside of the boom 122 by a resistance-activating pulley assembly, which in this case is a "weightlifting" pulley assembly comprised of a lower boom pulley 124 and an upper boom pulley 126, after which the cable 114 then connects to weight 128.

In this embodiment, the resistance-transmitting line 114 is a weight machine cable configured to lift weight 128 in cooperation with a weightlifting pulley assembly 124, 126 coupled with the frame 104. In other embodiments, the line 114 can transmit resistance generated by other means, such as: via the stretching of an elastic band; or by the bending of a resistance rod (also known as a tension rod), for example. Still other resistance-generating elements may occur to one of ordinary skill in the art.

The weight 128 can be held steady by a stabilizing cable 130 that runs adjacent to the weightlifting cable's weighted portion 132 (the portion dropping vertically from the upper boom pulley 126 to the weight 128). As shown, the stabilizing cable 130 can be anchored at its top end to the upper end of the diagonal boom 122, and at its bottom end to the base 102. This stabilizing cable 130 prevents the weight 128 from swaying off its vertical axis, and thereby becoming destabilized. In designs without the stabilizing cable, the user's form has to be more precise to prevent sway of the weight suspended freely from the cable.

In embodiments where the resistance-transmitting cable 114 transmits resistance that is generated by an elastic resistance band or a flexible resistance rod, the elastic resistance band can provide linear variable resistance, engaging the muscles with greater resistance as the muscle's own strength capacity increases. This can lead to increased benefits during gluteal exercise. Inclusion of elastic band is taught and described in greater detail below, in connection with FIGS. 10 and 11.

The swiveling pulley 106 of this embodiment is free to fully rotate in its horizontal plane, and also to tilt in its orientation. It is unobtrusive enough to enable a user to stand in close proximity to and straddle the swivel axis 116. While not exercising, the user can stand in a single neutral stance with no resistance applied. However, even a small displacement of the exercising leg for hip extension and/or abduction can generate resistance.

To emphasize, this versatile swiveling pulley 106 functions as an enhanced line-swiveling assembly, whereby the user is able to perform the full range of any combination of hip extension and hip abduction under continued resistance, while also returning to the same neutral stance at the end of a given set of leg motions. Such convenience is not made available by line-swiveling assemblies typically found in the art of lower body fitness machines.

In addition to enabling hip extension and hip abduction, the line-swiveling assembly 106 also can allow for nearly all degrees of flexion for anterior musculature strengthening that goes beyond enhancement of the gluteal muscles. And with every available motion, the neutral standing position itself encounters no resistance, yet a slight displacement in any direction immediately does yield resistance. This feature is optimal for exercise yet not available in conventional gluteal exercise machines.

Ease of exercise can be further enhanced by a lower extremity receiving device (hereinafter referred to as "LERD") 134 attached to the line's pullable end. In this embodiment, the LERD 134 includes a loop which can receive a user's foot during exercise. A horizontal opening along a distal portion of the loop can be secured around the user's heel during hip extension, while the loop in its entirety can wrap around the side of the user's foot during hip abduction. More highly designed LERDs are described in an accompanying app, and pictured later in this document.

Unlike the bulky pulley assembly of many prior art exercise pulleys, the customized pulley 106 of FIG. 1 can enable the LERD 134 to rest on the floor. The LERD 134 can include structural support that keeps it erect and poised to receive a user's foot, as shown, so that the user can step in and out with ease. This relieves the user from the need to manually engage or disengage the device with their foot, or to change their foot's orientation in the device by hand when changing up sets.

This illustrative embodiment 100 also includes a boom hinge 138 which enables the distal upper end of the diagonal boom 122 to be folded downwards so the boom collapses adjacent to and parallel with the vertical support post 120; as well as a post hinge 140, which enables the vertical support post 120 to be folded downwards to lie adjacent to and parallel with the base 102. The hinges 138, 140 can be locked into the closed or open state, to securely fasten the frame in the desired state.

2

FIG. 2 is a perspective view of a functional framework of the illustrative embodiment. The functional framework 200 is an isolated grouping of key elements of the illustrative embodiment, which together are responsible for enabling a core functional objective of the present invention. Specifically, the geometrical alignment, spatial relationship, and relative positioning of these elements enable a user to perform the full range of motion for any combination of hip extension and hip abduction, all while under continuous resistance, from a single standing location and with ideal posture.

The line-swiveling assembly 106 in this case is a swiveling pulley. It is configured to engage with the resistance-transmitting line 114 to enable its pullable end to swivel about the swivel axis 116. The swiveling pulley 106 itself is capable of swiveling in a full swivel circle 202. However, a user need not cross their leg in front of them to extend or abduct their hip. Therefore, the line 114 itself swivels through a swivel arc (see FIG. 1) that is bounded at the user's "12-o'-clock" position, where the frame (not shown) itself extends to guide the line 114.

The gripping device 108 includes a plurality of grippable areas positioned along a substantially horizontal grip locus 112, where the grip locus 112 is positioned relative to the swivel axis 116 in a manner that allows a user to stabilize themselves in a "tripod posture" (formed by both arms and a standing leg) during any combination of hip extension and abduction, even when under considerable exercise resistance. In the embodiment shown, the grip locus 112 is a horizontal grip axis.

The grip locus 112 is the locus of points along which all grippable areas lie. It does not actually extend beyond the outermost grippable areas of the gripping device 108, but as it is depicted and labeled in FIGS. 1 and 2, it is shown extending beyond the gripping device 108 solely for illustrative purposes. The grip locus 112 need not be a straight axis; it may be curved or bent. It can take any shape that would enable a user to perform full range of motion for any combination of hip extension and hip abduction with proper form.

In this embodiment, the gripping device 108 is a grippable bar positioned along a grip axis 112. This design enables a user to engage the gripping device 108 in a manner similar to a ballet bar. All hip and other lower body exercises that a ballet dancer might practice with such a bar would also be available to a user of this embodiment, with the extra benefit of added resistance for more intensely engaging gluteal and/or other lower body muscles.

The ballet bar 108 is one possible embodiment of the gripping device. In some embodiments, the gripping device may be a curved rail or a bent rail, while in other embodiments it may include a set of horizontal handlebars, or even a set of vertically oriented handles, for example. In each instance, the gripping device 108 is designed and positioned to allow a user to maintain tripod posture all throughout their exercise.

As defined herein, the user can be said to be in "tripod posture" if their standing leg adjacent to the swivel pulley and their hands spread sufficiently wide on the grip axis to allow their torso to lean slightly opposite their lifting leg.

This positioning requires anterior-posterior separation 136 of the grip locus 112 from the swivel axis 116, allowing their torso to lean slightly opposite their lifting leg. This positioning requires anterior-posterior separation 336 of the grip locus 312 from the swivel axis 316, to allow the user's the three stationary limbs to be widely separated (a theoretical tripod configuration). This confers maximal torso stability to resist the torque of the resistance on the lifting leg. This is an important departure from other machines.

The swivel-grip separation 136 is made more clearly visible in FIG. 2 by reference to a depth dimension indicator 204, which indicates the spatial relationship between the swiveling pulley 106 and gripping device 108. During exercise, a user must contribute a pulling force 206 that is equal and opposite to the force of resistance 208. The forces on either side of the swivel axis 116 must effectively balance, and it is helpful for the user themselves to be balanced about the swivel axis 116. Since their lower body is posterior to the swivel axis 116, it can be advantageous for their upper body to be anterior. Similarly, if the lower body moves laterally to one side, the torso can lean slightly to the opposite lateral side as a counterbalance.

The key functional aspect of the gripping device 108 which allows the user to maintain tripod posture during any combination of hip extension and hip abduction under exercise resistance is its position relative to the cable-swiveling assembly 106: the grip locus 112 is set apart 136 from the swivel axis 116. Decoupling 136 these two element alignments 112, from 116 provides a far more efficient spatial arrangement for the exercise enthusiast than the prior art under consideration.

While on the one hand, the grip 112 must be in front of the user, on the other hand, the swivel 106 needs to be positioned at the user's feet, so that the force of resistance is perfectly opposite to and in line with the exercising leg's movement. If the swivel 106 was not placed at the feet but further forward instead, then leg movement during abduction would be complicated by a forward force vector of resistance. This would yield especial difficulty at the beginning of leg movement, when the proportion of the forward vector would be largest.

The horizontal displacement 136 of the grip locus 112 from the swivel axis 106 is made possible in part by an intermediate guiding pulley 124, which in FIG. 1 was referred to as a "lower boom pulley." This intermediate guiding pulley 124 occurs in other embodiments shown and discussed herein. This pulley 124 is integral to the functional framework 200. It enables the swiveling pulley 106 to swivel freely by guiding the cable 114 on an acute angle pathway about the swiveling pulley 106; but by also guiding the cable 114 into an obtuse angle about itself 124, it prevents the cable 114 from obstructing the leaning space 110.

The intermediate guiding pulley as shown 124 is strategic in its position, being located above the line-swiveling assembly, but no higher than substantially the hip height of a user. But the intermediate guiding pulley 124 need not be located above the swiveling pulley 106 in order to accomplish its key functional objective. For example, in functional frameworks of alternative embodiments, it is possible for an intermediate guiding pulley to be located below the swiveling pulley 106, such as in the instance of a base thick enough to house a pulley. Such a pulley would still guide the line 114 on a right angle path about the swiveling pulley 106, but in that case, the line 114 would be directed downward, instead of upward (as shown here).

The intermediate guiding pulley 124 positioned at or below the user's hip height is a key feature of the functional framework 200 that sets it apart from much of the prior art. For example, in known machine embodiments (common cable machine) where a user stands near a swiveling pulley, the design does not introduce an intermediate guiding pulley 124 at or below hip height, because such designs do not prioritize the goal of providing a user with optimal gluteal muscle targeting. Instead, they include a guiding pulley that is fixed at the top of a long vertical track, which enables the swiveling pulley itself to slide up or down the vertical track and be repositioned at will, depending on the desired exercise (ranging anywhere from shoulder to arm to leg exercise).

In the embodiment shown, the grip locus 112 is substantially at least forearm length 136 from the swivel axis 116, thereby enabling strong tripod posture. In other embodiments, the grip locus 112 can be closer to the swivel axis 116, such as hand length, for example. Also, in some preferred embodiments, the gripping device 108 can be substantially at least hip height above the floor and/or its grippable areas span substantially at least shoulders width, as is the case in FIG. 2.

The grip locus 112 must span the proper width. The grip locus 112 is defined herein as the locus of points along which all grippable areas lie, and as such, it does not actually extend beyond the outermost grippable areas of the gripping device 108. To be sure, the grip locus 112 as depicted and labeled in FIGS. 1 and 2 is shown extending beyond the gripping device 108 for illustrative purposes; however, the true grip locus 112 is coextensive with the gripping device 108, and it terminates where the gripping device 108 itself terminates.

Proper positioning and extension of the grip locus 112 requires that its extent be wide enough to allow a user to properly perform full range of motion during hip extension and/or abduction. Therefore, in addition to the gripping device 108 being separated from the swivel axis 116, the span of the gripping device 108 must extend away from the swivel axis 116 far enough in both directions as to enable a user to comfortably and effectively stabilize themselves throughout the full motion of these hip exercises. Abduction requires even more width of the grip axis.

Part and parcel to the benefit conferred by the swivel-grip separation 136 is the presence of the leaning space 110 that allows a user to lean their upper body forward and take full advantage of the swivel-grip separation 136, as well as the enhanced stability it affords. As the user lifts their exercising leg, it is natural for the user to wish to lean forward to help them balance their lower body's movement with a counter-force from their upper body. When the user leans forward, the pelvis tilts forward, and increases the available range of hip range of motion by 200%, allowing more gluteal work with each set. This ideal posture is made possible by the synergistic effect of the combination of the leaning space 110 and swivel-grip separation 136.

Due to the harmony of these relationships, a user is able to comfortably perform any combination of hip extension and abduction from a central standing position that substantially straddles the swivel axis 116. The strategically small swiveling pulley 106, with its tight swivel radius, provides the clearance to enable the user to stand in this central position. By straddling the swivel axis 116, the user is able to overcome the tension of the line 114 with a perfectly opposing force from their exercising leg, as well as deftly balance their upper body by leaning in the direction perfectly opposite their exercising leg.

Such a precise counterpoise of force vectors, with no tangential forces disrupting any of the user's exercise movements, is only possible when the user avails themselves of this special "swivel straddle" stance. If the user were not straddling the swivel axis 116, they would experience at least some orthogonal force vector disturbing the arc of their leg's movement, and/or they would be compelled to supply at least some twisting and/or torsion of their body to maintain balance. Furthermore, they would have to shuffle their feet to change direction of leg movement and/or to abduct their opposite leg.

All benefits of the swivel straddle stance converge on a common theme: unparalleled efficiency in isolating one's gluteal musculature. From this stance, a user is able to lean into tripod posture and focus the full force of resistance 208 on their gluteal muscles without having to apply torque from any part of their body. The stance also relieves the user of the need to reposition their footing or change their body's orientation for different leg motions, or when switching their exercising leg. And when the user returns their leg to the upright standing position between sets, the line 114 returns to its neutral resting state: thus, freed from any persistent force of resistance 208, their leg can also come to rest.

By enabling this swivel straddle stance, the swivel-grip separation 136 and leaning space 110 work naturally together to promote the user's best posture during gluteal exercise. This enables the user to exercise their gluteal muscles in an efficient and comfortable manner, making the process safer, healthier and more enjoyable. It also promotes superior gluteal muscle building due not only to a greater range of motion, but also to a greater strength capacity of the body when exercising in its normal, healthy and anatomically preferable bearing.

The embodiment shown offers superior gluteal muscle targeting by enabling a user to execute various leg motions that simultaneously comprise both partial hip extension and partial hip abduction. As just one example, studies indicate that a 45 degree lateral leg movement comprised of half hip extension, half hip abduction, which works the gluteus maximus along the orientation of its fibers, yields optimal results.

This embodiment and other embodiments discussed below can also enable a user to perform hip rotation, adduction, and even flexion, enhancing their lower body workout even further. In addition to allowing more leg movement options with better form, it also allows for change in the trajectory and/or orientation of the leg within a given repetition, even enabling such movements as kicks or sweeps. All this can be achieved from a single convenient standing position.

Exemplary Machine Embodiments

Figure 5A:
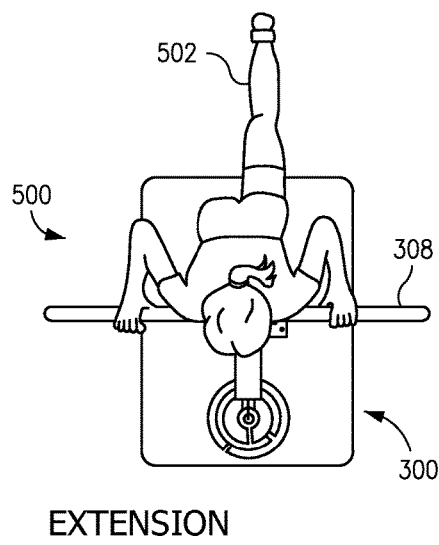
FIG. 5A is a top view of a user using the embodiment of FIG. 3 to perform hip extension.
Figure 5B:
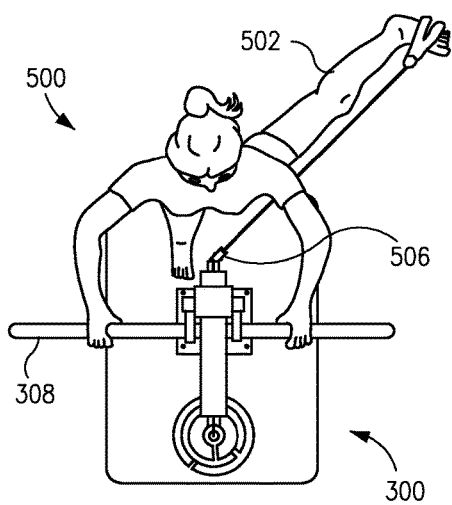
FIG. 5B is a top view of the embodiment of FIG. 3 being used to perform simultaneous hip extension and abduction.
Figure 5C:
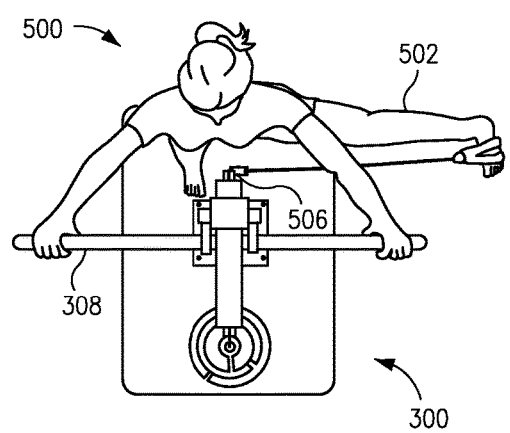
FIG. 5C is a top view of the embodiment of FIG. 3 being used to perform hip abduction.
Figure 5D:
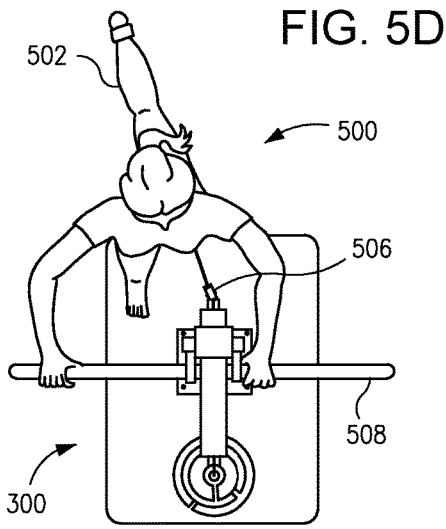
FIG. 5D is a top view of the embodiment of FIG. 3 being used to perform hip adduction.
Figure 6:
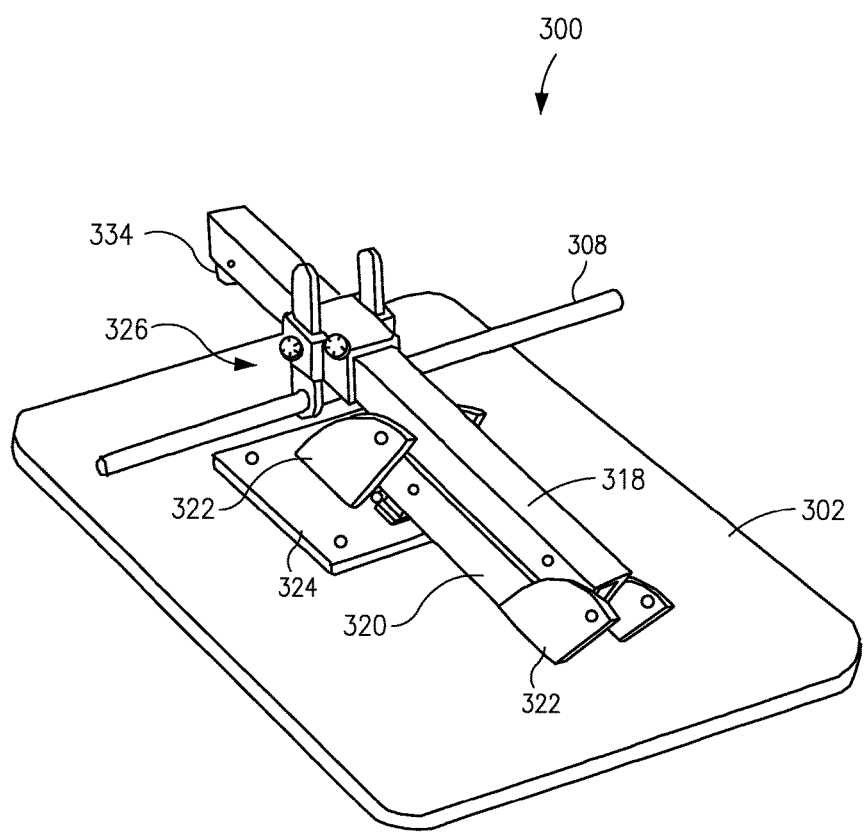
Figure 7:
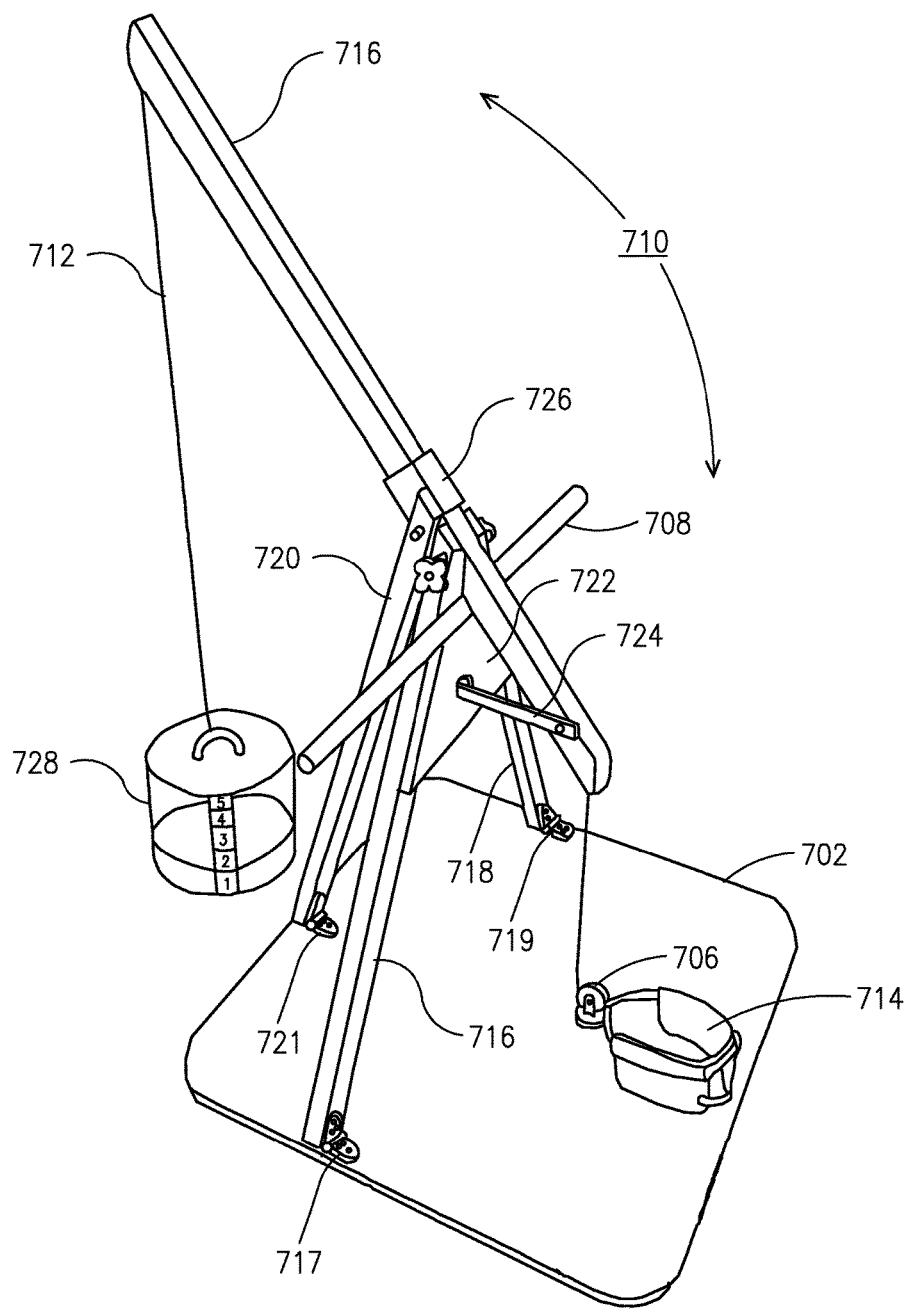
Figure 10A:
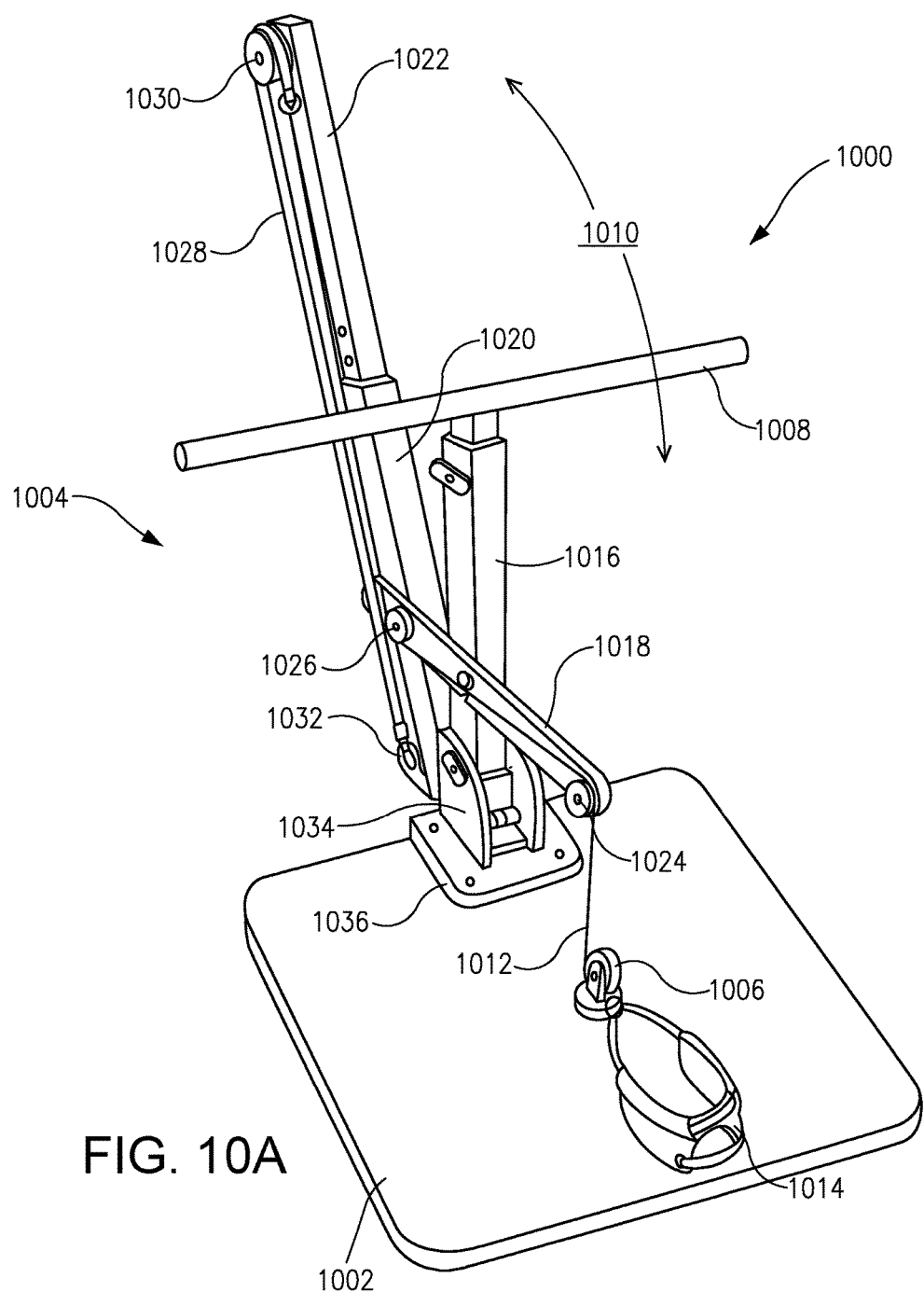
FIG. 10A is a front oblique view of an embodiment of the invention including an elastic band whose length and tension can be adjusted along a telescoping arm.
Figure 10B:
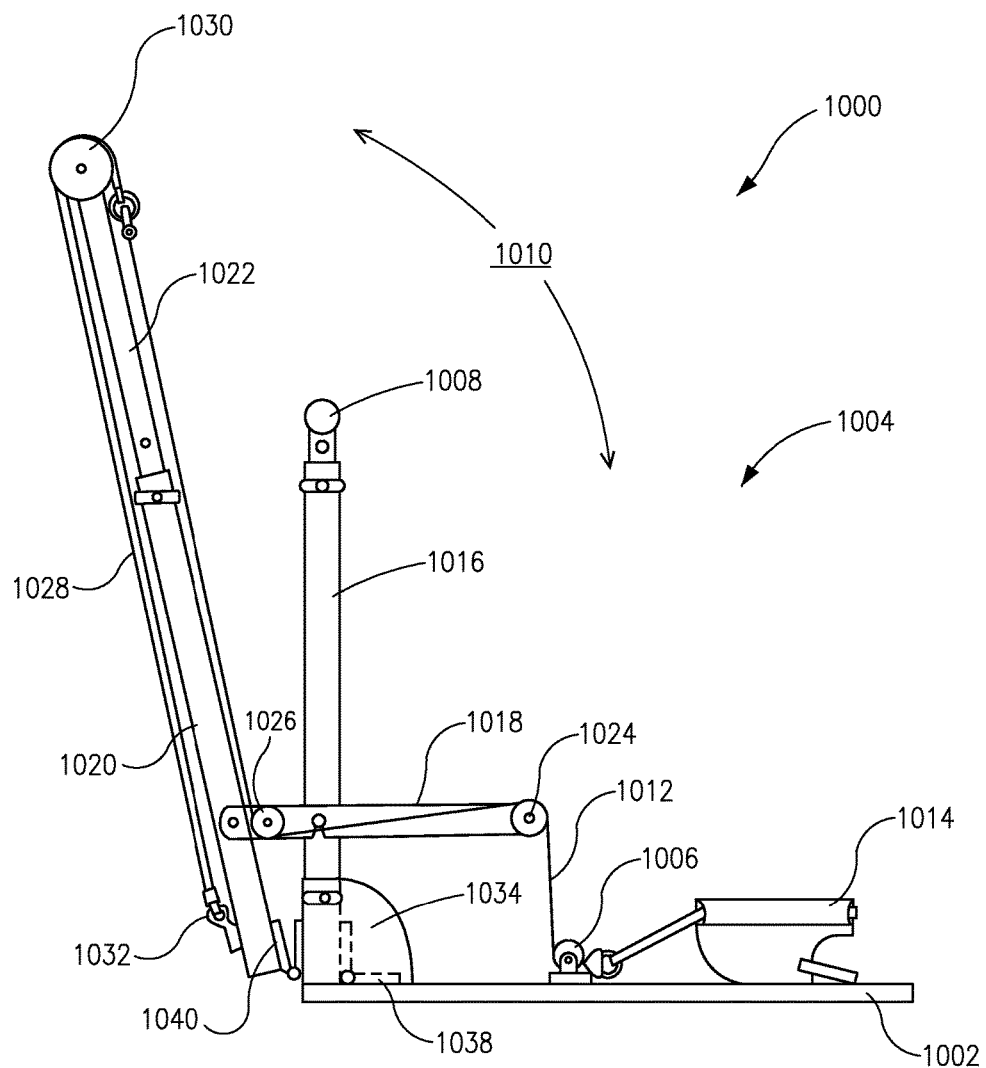
FIG. 10B is a profile view of the embodiment of FIG. 10A.
Figure 10C:
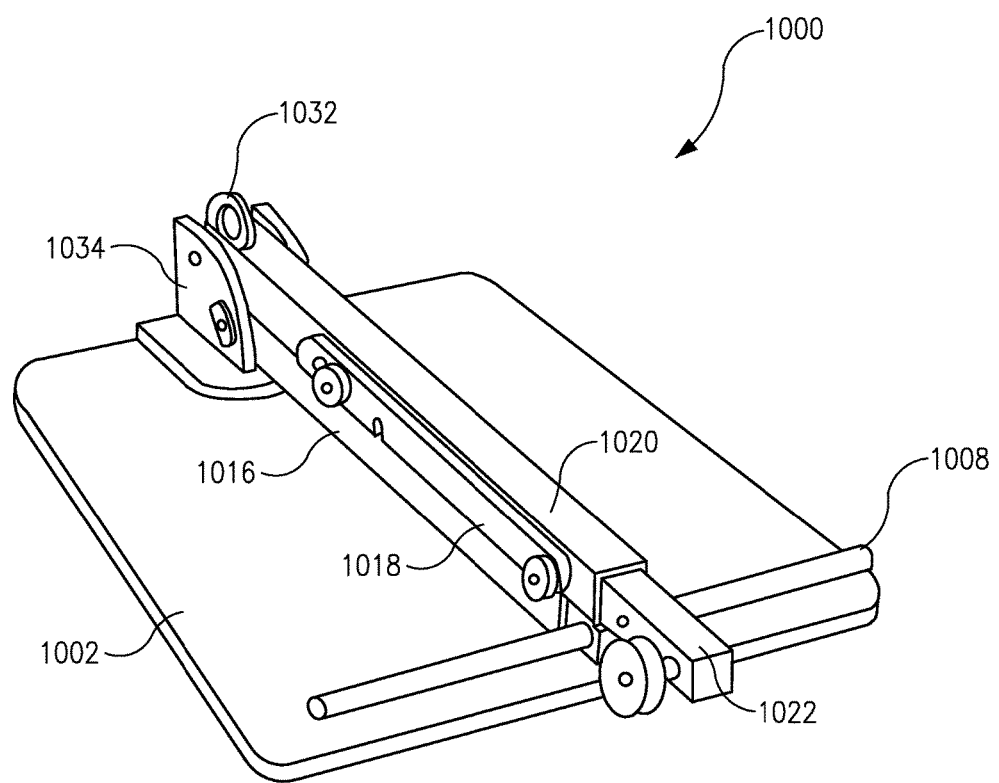
FIG. 10C is a front oblique view of the embodiment of FIG. 10A with its frame fully collapsed into a stowable position.
Figure 11A:
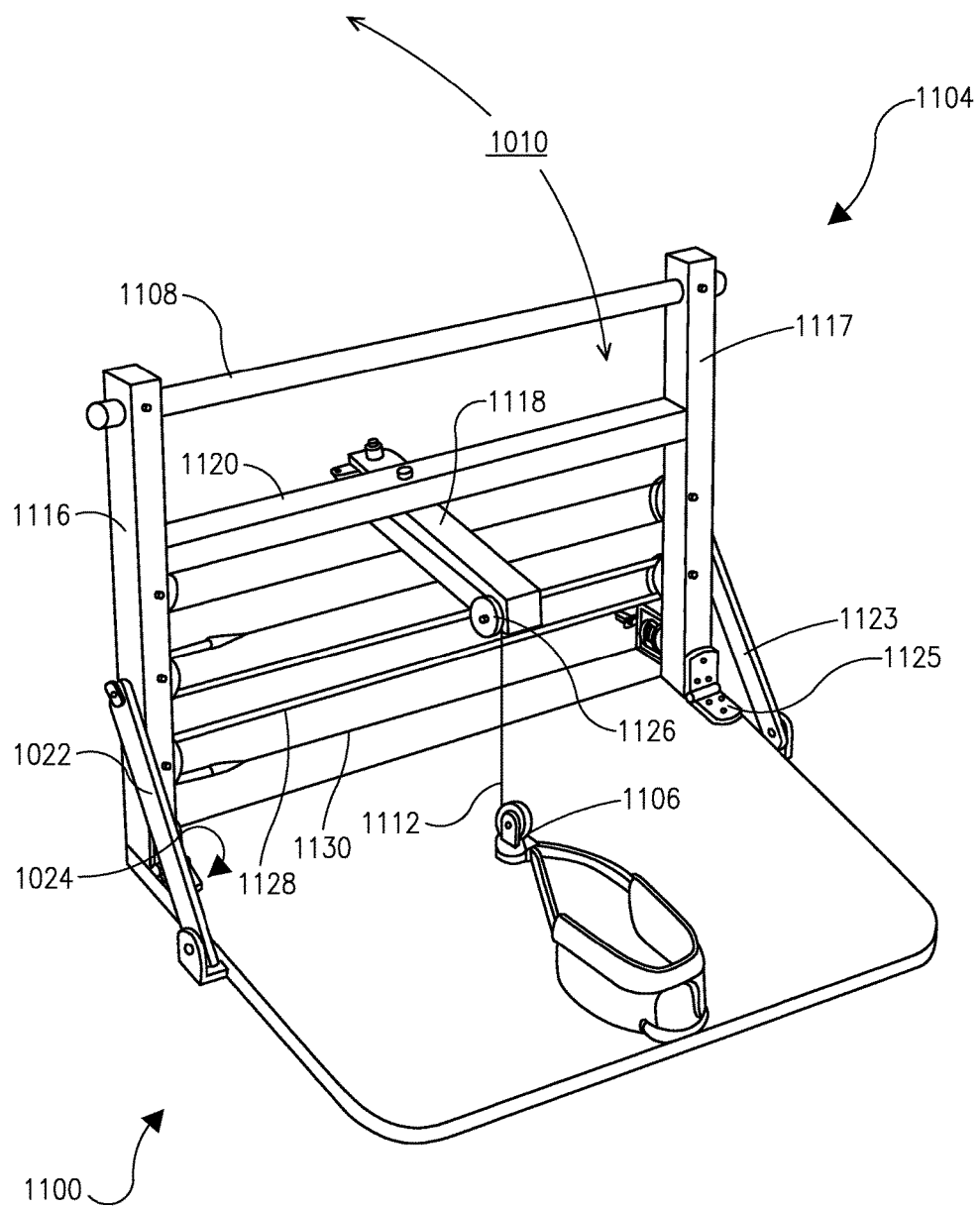
FIG. 11A is a front oblique view of an embodiment of the invention including a horizontally compounded elastic band whose tension can be adjusted by a hand crank.
Figure 11B:
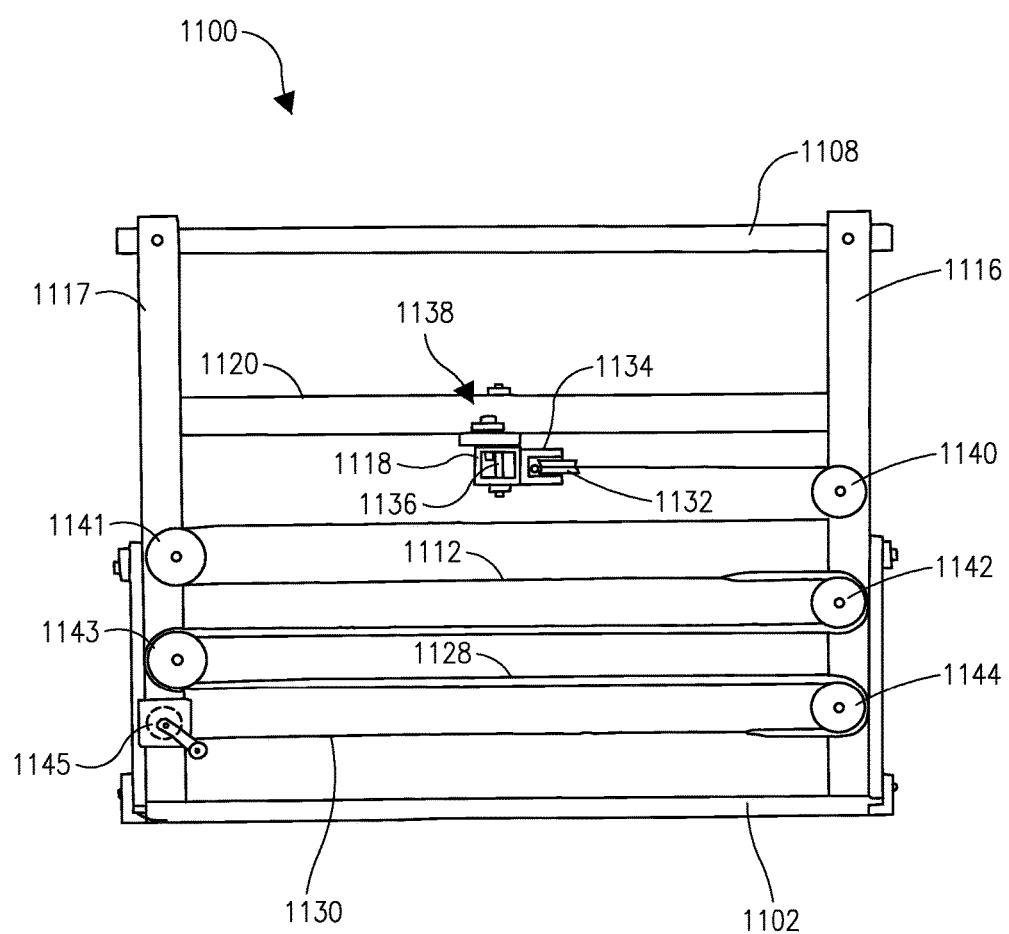
FIG. 11B is a rear view of the embodiment of FIG. 11A.
Figure 11C:
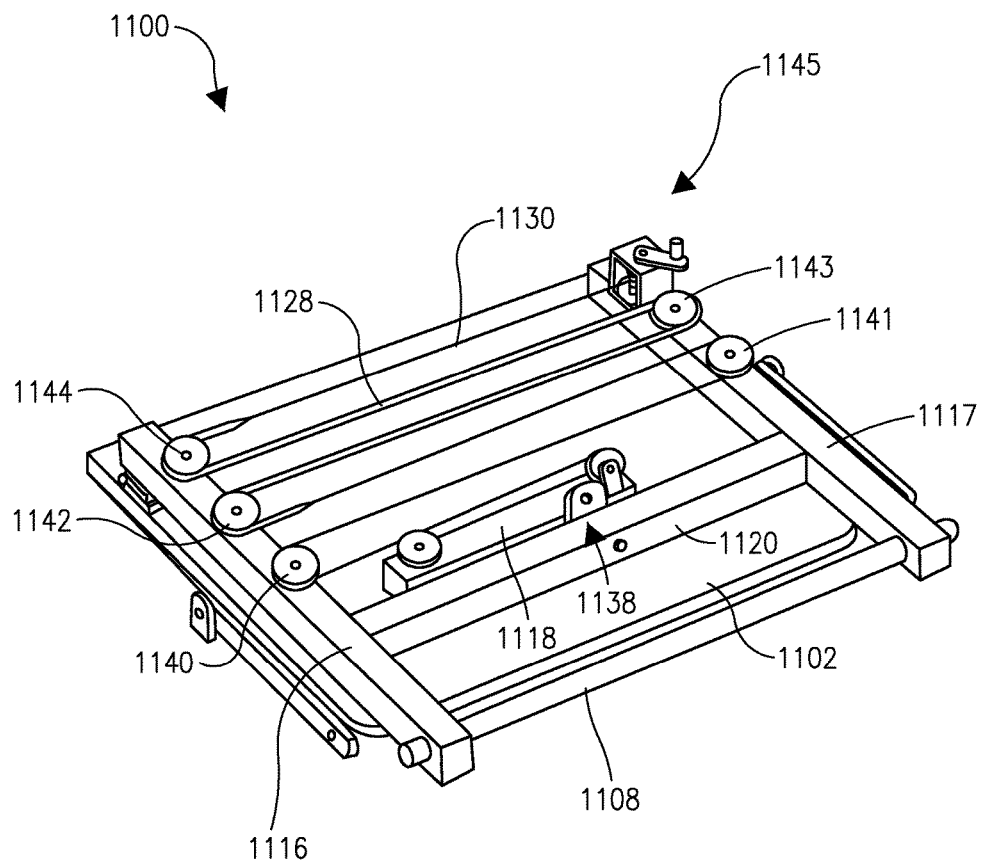

FIGS. 3-12 show exemplary machine embodiments of the invention and its central collapsible and stowable functionalities, specifically: FIGS. 3-6 include views of a streamlined design embodiment, its use and collapsibility; FIGS. 7-9 include views of a three-legged embodiment, its use and collapsibility; FIGS. 10-11 include views of embodiments incorporating an elastic band, their use and collapsibility, and FIG. 12 shows views of an embodiment that cooperates with a general purpose machine.

3

Figure 3:
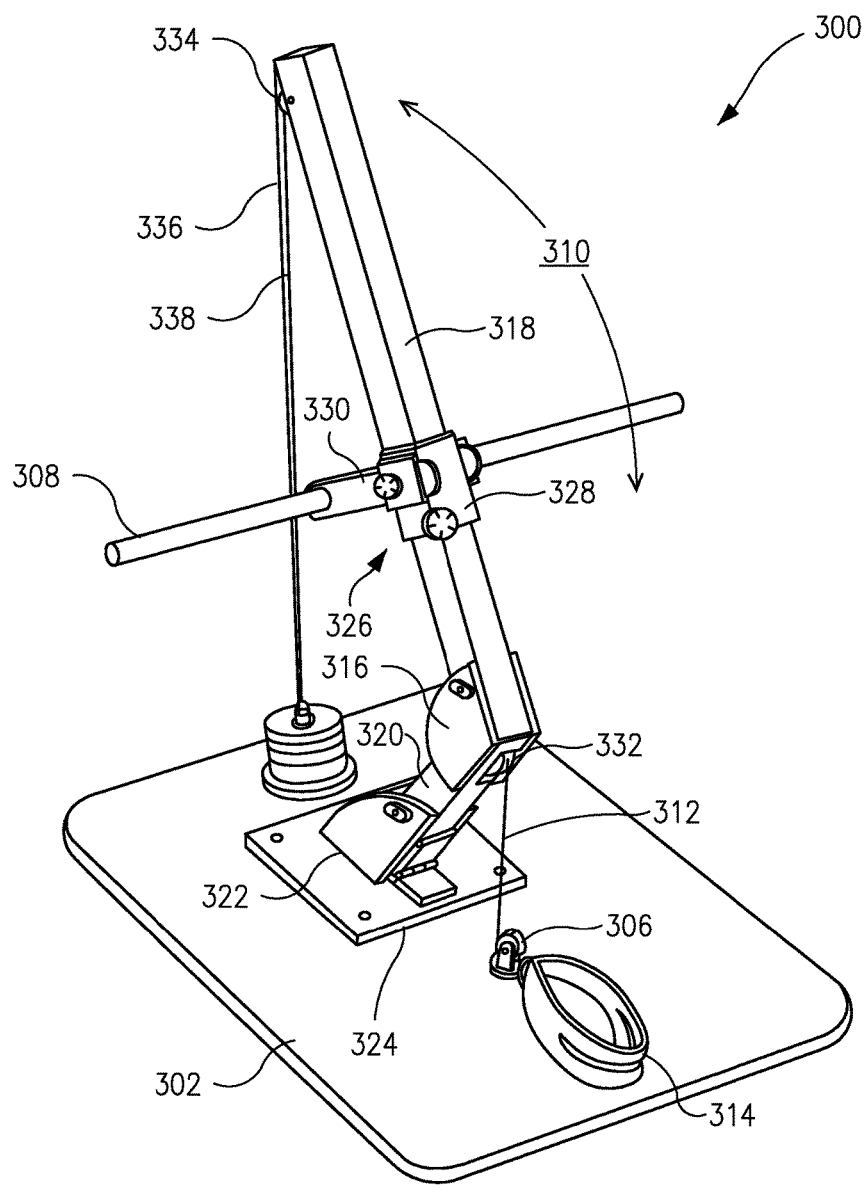

FIG. 3 is a front oblique view of a possible commercial embodiment of the invention with a hinged, mon-tube design. This embodiment 300 is unique in providing a design that is both robust and streamlined. The embodiment 300 includes a base 302, a frame 304 attached to and supported by the base 302, a line-swiveling assembly 306 coupled with the base 302, a gripping device 308 connected to the frame 304, and a leaning space 310 that allows a user to lean their upper body for full range of hip extension and/or abduction.

While certain elements shown here (such as the frame 304, for example) are unique to this embodiment 300, the same functional framework of FIG. 2 is present, and achieving the same benefits here as previously discussed. The structural variations of this embodiment 300 therefore do not depart from the essence of the inventive concept. Instead, those variations commingle with and enhance the effectiveness of the functional framework, thereby asserting and demonstrating its value even more clearly.

In this embodiment 300 the line-swiveling assembly 306 is a swiveling pulley configured to engage with a resistance-transmitting line 312 to enable a pullable end of the cable 312 to swivel about a vertical swivel axis, thereby allowing a user to pull the pullable end with an exercising leg (via the lower extremity receiving device 314 or "LERD"), to perform full range of motion for any combination of hip extension and hip abduction under resistance, from a single standing position that substantially straddles the swivel axis of the line-swiveling assembly 306. Here, a weight machine cable 312 is being used as a resistance-transmitting line.

From the line-swiveling assembly 306, the line 312 is guided across the frame 304 along a pathway laid out by a series of pulleys, discussed below. The frame 304 itself includes two angled segments supported and locked into their use-ready relative positions by an elbow buttress hinge 316. The elbow buttress hinge 316 holds together a diagonal boom 318, and a lower support post 320 to which the boom 318 is hingedly connected. The lower support post 320 is in turn supported by a base buttress hinge 322, and hingedly connected to a baseplate 324 attached to the base 302.

The gripping device 308 is mounted to the diagonal boom 318 via a gripping mount 326 which, in this embodiment, includes adjustment features. The gripping mount 326 includes a grip-elevation adjustment mechanism 328, which enables the mount to be positioned at any elevation along the diagonal boom 318 via loosening and retightening of a knurled knob. Adjusting the elevation of the gripping mount 330 along the diagonal boom 318 effectively adjusts the position of the gripping device 308 relative to the user.

The gripping mount 326 also includes a grip-depth adjustment mechanism 330, which adjusts the position of the gripping device relative to the axis of the diagonal boom. In this embodiment, the gripping device 308 is positioned opposite the diagonal boom 318 from the user's perspective. The gripping device 308 can be adjusted closer or farther from the diagonal boom 318, by loosening and retightening a knurled knob against a slidable adjustment fork. Grip depth adjustment can be useful for positioning the gripping device 308 for hip flexion exercise, for example.

To position the gripping device 308 in front of the diagonal boom 318 from the user perspective, the slidable adjustment fork 330 can be fully removed from its sleeve, then inserted back into the sleeve from the opposite (user) side of the boom. Both the grip-elevation adjustment mechanism 328 and the grip-depth adjustment mechanism 330 that are located on the gripping mount 326 combine to yield a comprehensive swivel-grip displacement adjustment system, providing the user substantial control over the position of the gripping device 308 including its position relative to the swivel axis, and thus relative to the user.

The line 312 is a weightlifting cable configured to lift weight when pulled with sufficient force. The weightlifting cable 312 is guided across the frame 304 via pulleys. First, it is guided vertically upward from the swiveling pulley 306 to a strategically placed elbow pulley 332 inside the elbow of the frame 304, acting as an intermediate guiding pulley 332. It is then guided along the inside of the diagonal boom 318, where it then encounters a boom pulley 334 at the top of the boom 318. The elbow pulley 332 and boom pulley 334 function together as a weightlifting pulley assembly.

A stabilizing cable 336 drops down from the top edge of the diagonal boom 318, running adjacent to the weightlifting cable's weighted portion 338. The weightlifting cable 312 itself drops vertically down from the boom pulley 334, connecting at its weighted end to liftable weight 340. The stabilizing cable 336 is connected at its top end to the boom 318 and at its bottom end to the base 302, and is held taut between those anchor points to keep the liftable weight 340 from swinging. The liftable weight 340 rests on the weight base 302 when it is not being lifted.

The embodiment shown 300 achieves a robust but streamlined design. With a frame 304 that is strong but minimal in its mass, this embodiment 300 can function as a weight machine in a home setting, and may be erected and collapsed at will for easy transport, storage and/or setup and use. Such a system of buttress hinges 316, 322 as shown here allows for collapsing of the frame 304 down to a stowable state that is substantially adjacent with and parallel to the base 302.

4

Figure 4:
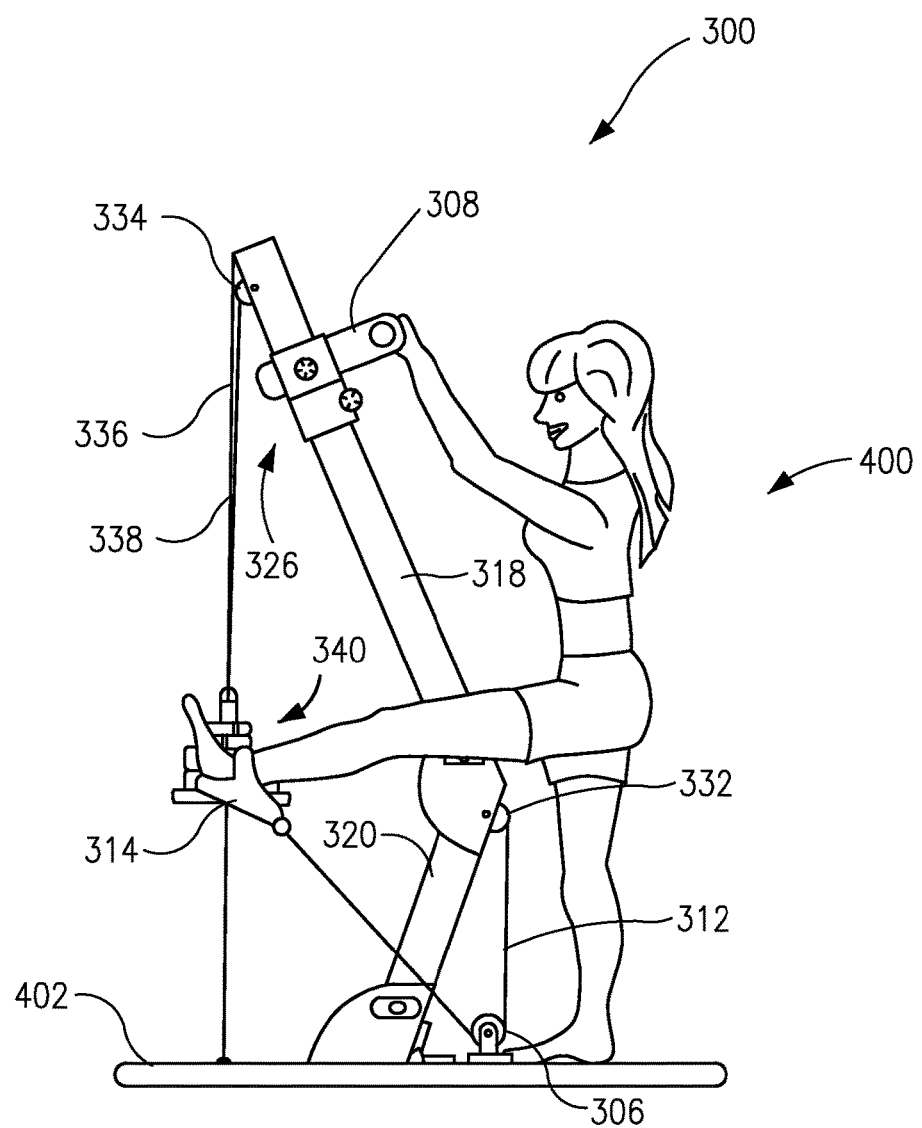

FIG. 4 is a profile view of the embodiment of FIG. 3 being used to fully perform hip flexion. Relative to gluteal development, flexion exercise capability is different focus, yet an added bonus. The narrow width of the frame 304 from the perspective of a user 400 facilitates the performance of any desired hip flexion exercises, as shown. Given that no frame elements extend outside of the narrow profile that is occupied by the lower support post 320 and the diagonal boom 318, a user's exercising leg can be flexed directly outward and upward, encountering no obstructions along the way.

In this figure, a user 400 is using the embodiment of FIG. 3 to perform hip flexion. This exercise can be used to target lower body muscles other than the gluteal muscles, such as the iliopsoas, rectus femoris, and tensor fascia latae, as well as the abdominal muscles. The user 400 may wish to raise their exercising leg straight in front of them. The narrow profile of the frame, and the height-adjustable grip, make the full range of such straight hip flexion motion possible. The thin width of the central components of the frame 318, 320 allows for full and unimpeded flexion of the hip-flexing leg.

As shown here, the user 400 can flex their hip under resistance from the line 312 by putting the front of their foot through the socket of the LERD 314. Hip flexion can also be performed swiftly for practicing front kicks under force of resistance. This profile view illustrates the value of extending the height of the gripping device 308, which can be achieved by sliding the gripping mount 326 upwards along the diagonal boom 318. Due to the relative weakness of flexor muscles, the weight 340 can incrementally be calibrated down as appropriate.

The integral value of the central swivel straddle stance is apparent when considering the hip flexion exercise shown. As is the case with hip abduction, for example, hip flexion also can be considerably compromised by force vectors orthogonal to the direction of motion of the exercising leg. If the user 400 were not straddling the swivel axis during hip flexion, then the direction in which they pull the line 312 would not be directly away from the swiveling pulley 306, and there would be a component vector of force that urges the user's exercising leg off course.

However, as depicted in FIG. 4, the user 400 is able to straddle the swivel axis due to the low profile design of the swiveling pulley 306 and the frame itself. While in this swivel straddle stance, the user 400 is able to sweep their leg forward with perfect form. The user 400 can also just as easily perform any desired combination of hip flexion and abduction, adding as much lateral movement to their exercising leg as they wish. In that sense, flexion extends the continuum of hip exercises that are allowed by the functional framework, to those anterior to abduction. Still no distracting force vectors will result, thanks once again to the unobtrusive design elements 318, 320 that enable continuous swivel straddle stance.

5

FIG. 5 is a top view of the embodiment of FIG. 3 being used to perform a wide spectrum of angular hip exercises. However, this same set of exercises can apply to all embodiments. FIG. 5A depicts a user 500 using the previous embodiment 300 to perform hip extension. As discussed above, hip extension is a relatively effective exercise for engaging the gluteus maximus, which is the largest gluteal muscle. It is readily apparent from this view that the user 500 benefits from being able to lean over the swiveling pulley and the gripping device 308 to facilitate maximum extension of their exercising leg 502.

An effective tripod posture can only be achieved if the user stands back from the gripping device. If the line-swiveling assembly (306, obscured in FIG. 5A) was not set apart from the grip axis 308, as it is here, then the user 500 would not be able to come to rest by bringing their exercising leg back to the standing position. Instead, the exercising leg 502 would have to be advanced farther forward than the standing leg to meet the cable-swiveling assembly 308, before returning to a truly neutral position. By contrast, the swivel straddle stance shown allows for "resting neutral."

FIG. 5B is a top view of the embodiment of FIG. 3 being used to perform simultaneous hip extension and abduction, specifically: half extension, half abduction. The hip has been rotated externally, and the exercising leg 502 brought 45 degrees laterally from the Sagittal plane. Because this movement follows the orientation of the gluteus maximus fibers (and thereby also avoids contraction of the hamstrings), it completely engages the gluteus maximus: even more so than with pure hip extension.

Hip rotation is made possible by the customized lower extremity device (LERD), described in greater detail above. External (or lateral) rotation of the hip during leg motions that involve some hip abduction activates the gluteus maximus more so than without rotation of the hip. The leg movement shown here is extremely effective in gluteal muscle exercise: in addition to fully engaging the gluteus maximus, the partial hip abduction also strongly engages the gluteus medius and minimus muscles. As discussed above, in contrast to the many other known machines, here the grip locus is offset from the swivel axis, enabling the user to lean forward to easily execute full range of motion and yielding far superior muscle activation.

This unique leg movement (called "the 45°" due to the angle of the trajectory of the exercising leg relative to the Sagittal plane) is the best combination of hip extension and hip abduction for maximally engaging the gluteus maximus, and is also of central importance in effectively engaging all gluteal muscles in general—especially when combined with external hip rotation, as shown. But in the absence of the displacement of the line-swiveling assembly 306 from the gripping device 308, this key exercise would not be achievable with proper form.

If the swivel axis of the line-swiveling assembly 306 was not set apart from the grip axis of the grip bar 308, the user 500 would be compelled to shift their standing position laterally, so that the cable's pathway from the cable-swiveling assembly 306 to the user's foot was in line with the movement of their exercising leg 502. Otherwise, leg movement would be compromised and distracted by a forward-component to the force vector of resistance. Furthermore, the user 500 would not be able to come to rest at the end of each repetition, for the same reason as noted above in connection with FIG. 5A.

FIG. 5C is a top view of the embodiment of FIG. 3 being used to perform hip abduction. Since hip abduction heavily engages the gluteus medius and minimus muscles, it is essential to a well-balanced treatment of gluteal muscle exercise. Proper form requires a wide grip, as shown. Moreover, separation of the grip locus from the swivel axis is absolutely essential for enabling the user to fully abduct their hip.

Straight hip abduction presents a classic case of the need for a stable tripod posture in achieving maximal gluteal muscle engagement. Without the user's arms functioning as widely spaced levers, allowing the upper torso to lean slightly away from the torque of the resisted lifting leg, the back might be strained, and form and range of motion would surely be compromised.

Tripod posture is indispensible to proper hip abduction, yet would not be possible without displacement of the swivel axis from the grip axis. On the other hand, with the swiveling pulley 306 displaced from the vertical plane of the gripping device 308 as in the present invention, the user 500 can fully abduct their exercising leg 502 with proper tripod posture, stabilizing themselves with their arms instead of their lower back. The customized LERD enables the user to perform hip abduction effectively, without any discomfort to the foot.

Finally, FIG. 5D is a top view of the embodiment of FIG. 3 being used to perform hip adduction. This exercise actually can be used to better target the lowest portion of the gluteus maximus. Because a user 500 must stand to the side of the swivel axis when adducting the hip, in order to keep their exercising leg's 502 motion in line with the line's pathway, a gripping device 1108 of substantial width is advisable, to allow for tripod posture throughout.

When considering this motion, once again the advantage of a horizontal displacement between the gripping device 308 and the swiveling pulley 306 is clear. The user 500 is able to rest their exercising leg 502 before and/or after each repetition of the hip adduction movement. This is due to the fact that the pullable end of the resistance-transmitting line is returned to the position of the swiveling pulley 306 once the exercising leg 502 returns to the standing position. In this neutral state ("resting neutral"), no resistance is activated.

It should also be noted that each of the exercises shown (as well as still other exercises, such as hip flexion) can be achieved with perfect form from a single standing position that substantially straddles the swivel axis, with continual resistance applied during the entire duration of the exercise, and resistance is inactive upon cessation of the exercise. This convenience greatly enhances the qualitative experience of gluteal exercise and muscle development.

The critical importance of the highly versatile central "swivel straddle" stance, in enabling proper form for all manner of gluteal exercise with a resistance-transmitting line, is immediately apparent in FIG. 5, and most specifically, FIGS. 5B and 5C. There, the user 500 is clearly able to perform any combination of hip extension and abduction without any distracting tangential force vectors compelling their exercising leg 502 to veer off its intended course. As noted above, this is also the case for any combination of hip abduction and hip flexion (see FIG. 4) attempted.

To be sure, the swivel straddle stance may seem less important during straight hip extension (see FIG. 5A). Extension motions conceivably could be executed even if the swiveling pulley 306 were directly below the gripping device 308, with the user 500 out of swivel straddle stance. But even in this narrow instance, the direction and intensity of the force of resistance is more likely to be discontinuous and disrupted if the user 300 is not straddling the swivel axis.

Nonetheless, the overwhelming majority of possible leg motions for well-rounded gluteal exercise with a cable involve at least some degree of (if not substantial) hip abduction. In all such cases, exercise is greatly compromised if the user 500 does not assume swivel straddle stance. This stance exclusively allows the user 500 to perform a wide variety of hip extension and hip abduction combinations with either leg, in full and proper form, without changing position.

6

FIG. 6 is a front oblique view of the embodiment of FIG. 3 with its frame fully collapsed into a stowable position. The lower support post 320 has been folded down to be substantially adjacent to and parallel with the base 302. It has been released from its locked position within the base buttress hinge 322 so that it may move freely into this collapsed position. Likewise, the diagonal boom 318 has been released from its position in the elbow buttress hinge 322 and folded down against the lower support post 320.

The gripping mount 326 can be moved upward along the diagonal boom 318 so that the gripping device 308 is clear of the base buttress hinge 322. This enables the diagonal boom 318 to fold down fully against the lower support post 320. In this collapsed configuration, the entire embodiment is now in an easily stowable position. For example, it could be stowed in a closet, under a table or potentially even a bed.

7

FIG. 7 is a front oblique view of an embodiment of the invention with a three legged frame. The embodiment 700 shares many structural features of the previous embodiment 300 such as its base, swiveling pulley, adjustable gripping device, and some aspects of its frame. However, this frame is unique in its three-legged tripod weightlifting frame design. This design is particularly lightweight, and again is quite easily collapsible and transportable.

While certain elements shown here (such as the frame, for example) are unique to this embodiment 700, the same functional framework of FIG. 2 is present, and achieving the same benefits here as previously discussed. The structural variations of this embodiment 700 therefore do not depart from the essence of the inventive concept. Instead, those variations commingle with and enhance the effectiveness of the functional framework, thereby asserting and demonstrating its value even more clearly.

The embodiment shown 700 includes a base 702, a tripod frame 704 hingedly attached to and supported by the base 702, a line-swiveling assembly 706 coupled with the base 702, a gripping device 708 connected to the frame 704, and a leaning space 710 that allows a user to lean their upper body for full range of exercise motion during any combination of hip extension and hip abduction, while under continuous resistance.

As with the earlier embodiment 300, the line-swiveling assembly 706 is a pulley configured to engage with a resistance-transmitting line 712 to enable a pullable end of the line 712 to swivel about a vertical swivel axis, thereby allowing a user to pull the pullable end with their leg via a lower extremity receiving device 714, or "LERD," to perform full range of motion for any combination of hip extension and abduction.

From the line-swiveling assembly 706, the resistance-transmitting line 712 is guided across the frame 704 along a pathway that runs along a diagonal boom 716 that is defined by a series of pulleys. Supporting the diagonal boom 716 are two front legs 716, 718 and a central rear leg 720, all attached to the base via hinges 717, 719, 721. These legs converge to provide structural support to the diagonal boom 716.

A trapezoidal support plate 722 is attached to an upper portion of the front of the two front legs 716, 718 and spans the space between them, and it also abuts the underside of the gripping device 708, supporting it from below. This support plate 722 adds a critical element of structural integrity of the entirety of the frame 704, in its erected-for-use state. A metal crossbar 724 extends from the rear leg 720, through a hole in the plate 722, and over to the proximal portion of the diagonal boom 716, for still further frame support.

The diagonal boom 716 is attached to the front legs 716, 718 via a knurled knob connector set, which secures the boom 716 tightly in its diagonal position relative to the front legs 716, 718, but may be loosened to act as a hinge, and facilitate collapse. The rear leg 720 is coupled to the diagonal boom via a sliding chamber 726. During collapse, it can act as a hinge relative to the rear leg 720 and it can slide up the diagonal boom 716. When set for use, it is locked securely to the position of the boom 716, by way of a locking pin.

From the swiveling pulley 706, the line 712 is guided across the frame 704. The line 712 is guided vertically upward from the swiveling pulley 706 to an intermediate guiding pulley (not shown) located at the proximal end of the diagonal boom 716, and then diagonally upward along the boom 716 to an upper pulley (not shown) at the boom's 716 distal end, after which the line drops to connect to liftable weight 728. The pair of boom pulleys (not shown here) together comprise a weightlifting pulley assembly.

In this embodiment, the line 712 is a weight machine cable configured to lift weight 728 in cooperation with the weightlifting pulley assembly, and the weight 728 to be lifted is a container of water. This type of weight complements the portable design of the apparatus itself. The container can be emptied and easily stored with the apparatus. A metric on the container 728 can indicate weight according to volume of water filled.

The water volume inside the container 728 can be adjusted manually, either by pouring water in and out or by use of a pump for example. Cheap mechanical pumps can be used to transfer water of a specified volume to and from the container 728. The water can be transferred between the container 728 and another vessel or tap operating as a sink and/or source. In some cases, even a powered pump can be used, such as a simple switch-operated pump that runs on batteries for example. Through the use of such methods, adjustment of water weight can be especially quick, accurate and easy.

8

FIGS. 8A and 8B are front oblique views of the embodiment of FIG. 7 being used to perform hip extension and hip abduction, respectively. This pair of images graphically illustrates the importance of hip abduction as a supplement to hip extension, for the purpose of attaining a fully sculpted and shapely buttock contour, as well as maximally strengthening the gluteal musculature and thereby also the body's core.

FIG. 8A is a front oblique view of the embodiment of FIG. 7 being used to perform hip extension. Hip extension is an efficient movement for exercising the largest gluteal muscle, the gluteus maximus. A user 800 leans to shift their weight forward and assume tripod posture with both arms 802 and their standing leg 804, as the fully extend their exercising leg 806 back. As a result, the gluteus maximus 808 of the exercising leg 806 is engaged.

The LERD 714 includes a loop into which a user can step to insert their foot. A horizontal opening along a distal portion of the loop receives the user's heel, enabling the LERD 714 to remain securely attached around their foot and ankle during leg motion primarily involving hip extension. In this capacity the LERD 714 enables full range of hip extension, without restricting the user's natural tendency to point their toes downward as the leg extends.

Despite the benefits of hip extension, this motion does not exercise the gluteus maximus 808 along the precise orientation of its fibers, nor does it even engage all of the gluteal muscles (in particular, the gluteus medius and gluteus minimus are not significantly targeted during "pure" hip extension, that is: hip extension that is not at all accompanied by hip abduction). At least some hip abduction (plus external rotation of the hip) is needed to fully activate the gluteus maximus 808, and indeed substantial hip abduction is required to activate the glueus medius and minimus muscles.

FIG. 8B is a front oblique view of the embodiment of FIG. 7 being used to perform hip abduction. The ability to abduct the hip is indispensible in developing one's gluteal musculature. Straight abduction (shown here) works the gluteus medius and minimus muscles 809, thereby leading to more balanced buttock strengthening and development, and more well-rounded appearance. Strategically combining hip extension with hip abduction can exercise all gluteal muscles 808, 809 with maximum efficiency.

For predominantly abducting the hip, the user can insert their foot partially into the LERD 714 so the entire distal portion of its loop wraps around the outside of their foot (rather than surrounding the heel, as in FIG. 8A), shown in FIG. 8B. This technique helps to support more of the user's outer foot during hip abduction, than in the case of leg motion comprised predominantly of hip extension, where the lower leg can more easily absorb the majority of the force of resistance transmitted from the line 712.

The versatile design of the LERD 714 provides a secure central attachment to the exercising foot during any combination of hip extension and hip abduction—even abduction that includes external hip rotation (which is particularly beneficial to gluteal maximus strengthening). The central attachment enables the line 712 to be guided perpendicularly away from the orientation of the foot of the abducting leg, without in any way interfering with proper form for hip abduction exercise.

The design of the present embodiment 700 greatly facilitates proper form for hip abduction, just as it does so for hip extension. Here, the user 800 can lean forward and assume stable tripod posture with a wide grip 802 near pelvis height, thus avoiding the strain of torsion or arching of their back. Furthermore, here the LERD 714 enables the user 800 to abduct their hip without the lateral force from the cable 712 pulling the front of their foot inward.

Not shown in this figure is an intermediate exercise that is half way between the two figures, ½ extension, and ½ abduction, the leg angling at a 45 degree away from the bar. The '45', allows for simultaneous contraction of all three gluteus muscles, and with the combination of the LERD wrapping the lateral foot, external rotation is added to the gluteal work. The '45' is the single most effective exercise to simultaneously exercise all three gluteal muscles.

FIGS. 8A and 8B illustrate the wide variety of hip and leg motion that can be executed safely and with proper form under resistance, when using the embodiment 700. Hip extension as shown in FIG. 8A, hip abduction as shown in FIG. 8B, and/or any combination thereof, can be performed with proper balance and optimal body mechanics. This versatility is due to the user's tripod posture, enabled by the horizontal spatial separation between the grip bar 708 and the swiveling pulley 706, as well as by the leaning space 710 above the frame.

The term "tripod" underscores the enhanced stability of this specific posture that is produced by the user's two arms 802 and their standing leg 804 during exercise. Its execution depends on the swivel-grip separation. If the grip locus was not separated anteriorly from the swivel axis, then the user's grip would not be anterior to their standing leg, and thus they would not be leaning forward and/or downward with their grip. In that case, they could not be said to be in tripod posture.

Tripod posture further enables a user to lean away from their exercising leg to enable it to exert its full range of motion, thereby activating their gluteal muscles to the greatest extent. It also distributes the user's mass more evenly, thereby providing superior balance. Finally, by enabling the user to appropriately tilt their torso and shift more weight to their shoulders, it minimizes the potential strain on their lower back.

By allowing a user to work their gluteal muscles with superior efficiency and comfort, the present invention enables a user to lift more weight and perform more assertive movements than other forms of gluteal exercise generally allow. Furthermore, the ergonomic form and posture supported by the present embodiment facilitates gluteal exercise through straight-legged hip extension and hip abduction movements, thereby minimizing joint strain as well.

This enhanced efficiency of movements is only possible because the user 800 is able to stand in a central position that substantially straddles the swivel axis. FIGS. 8A & 8B highlight well the versatility of this swivel straddle stance. As the user 800 exercises, they can extend and/or abduct either exercising leg 806 directly outward from the swiveling pulley 806 in whichever direction they wish, with no force vectors pulling them off course and no need to apply torque with their body. In addition, the user 800 can change up their exercise motion without having to alter their standing position, without having to contend with resistance from the cable 712 while resting in that position.

In these figures, the weightlifting pulley assembly is shown: the intermediate guiding pulley 810 at the proximal end of the boom 716, and the upper boom pulley 812 at the distal end of the boom 716. The structural integrity of the frame tripod 814 is visible here, as the user 800 leans into the approximate center of the gripping bar 708 in every exercise they perform. All legs and the extra frame supports converge to provide maximal structural integrity to this central region.

It should be noted that in some embodiments, a similar tripod frame can be constructed that is the converse of what is shown here: a pair of rear legs and a single central front leg. While such a tripod configuration would not have the same ease of collapsibility, it could enable the user 800 greater freedom of motion for hip flexion exercise, for example. However, the current design enables a "slide lock" collapsible frame functionality that is explored further in the next set of figures.

As demonstrated, the functional framework explored in FIG. 2 is integral to the benefits described here. The key functional elements, arranged in accordance with the parameters laid out in this discussion, provide the user with a superior experience and superior results. And while other embodiments may include variations on certain structural elements, such as the configuration of their structural frame or the nature of their resistance-generating element, they nonetheless employ this same familiar functional framework.

9

Figure 9A:
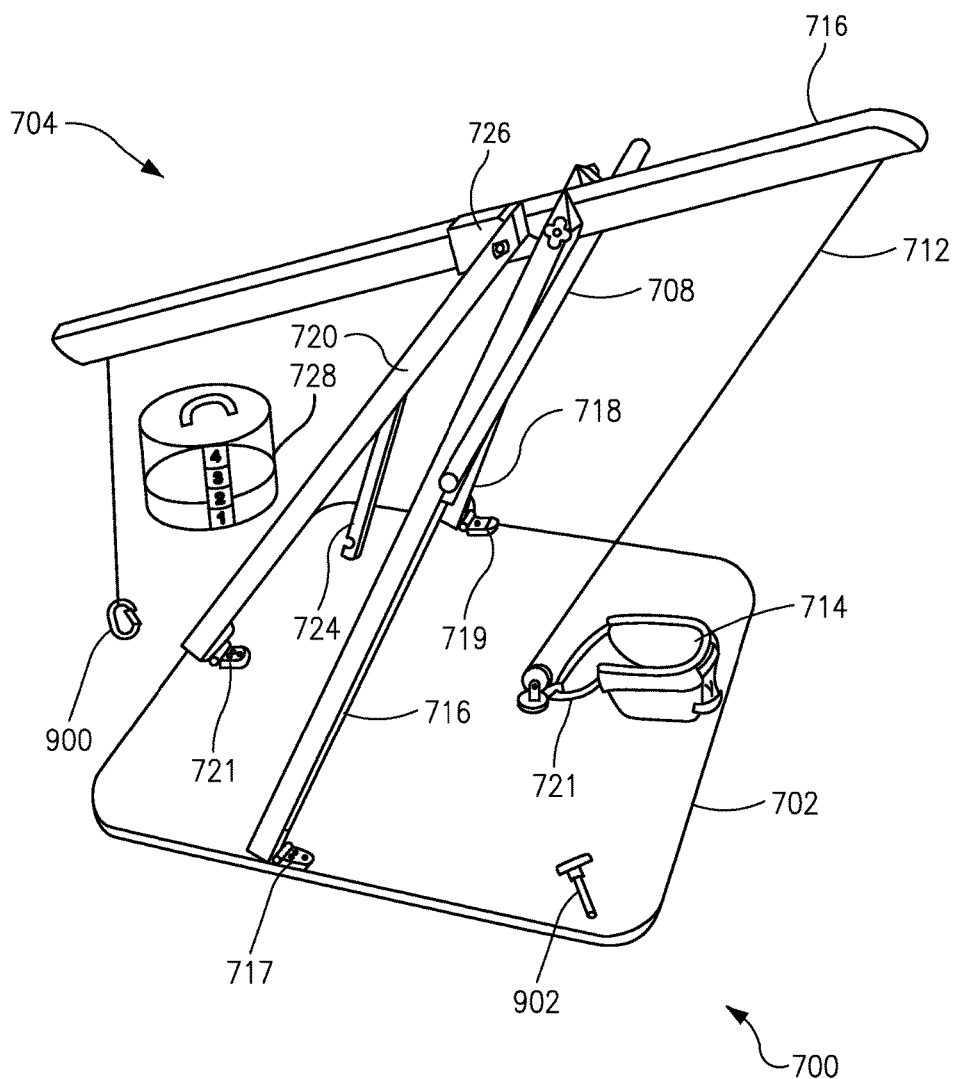
FIG. 9A is a front oblique view of the embodiment of FIG. 7 with its frame being collapsed down into a stowable position.

FIG. 9A is a front oblique view of the embodiment of FIG. 7 with its frame being collapsed down into a stowable position. This figure represents a partially erected, partially collapsed state of the frame: as such, it can be considered an intermediate stage in preparation for either setup for use, or collapse for stowing. It is therefore just as instructive for understanding how the frame can be erected and readied for use from an initially collapsed position, as in understanding collapse from an erected position.

As shown, the water container 728 can be alternately engaged with and disengaged from a terminal locking gate 900 at the load-bearing end of the line 712, for use and storage respectively. Furthermore, the water can be emptied from the container 728 and the container can be folded for easy storage and/or transport. For example, the container can be made of strong but deformable plastic, which can easily fold between the frame 704 and base 702 when in the collapsed state, for example.

The boom 716 can be disengaged from its fixed position relative to the rear leg 720 by releasing the locking pin 902 and unlocking the sliding chamber 726. Once unlocked, the sliding chamber 726 is free to slide relative to the boom shaft 716. Next, the metal crossbar 724 is disengaged from the boom 716 by releasing the hook on the metal crossbar 724 from its corresponding mating element (not shown) on the boom 716. This frees the boom 716 to fold down relative to all three tipod legs 716, 718, 720.

Before the boom 716 and rear leg 720 can fully collapse down, they must first be decoupled. This requires that the sliding chamber 726 be slid out towards the distal end of the boom 716, such that the metal crossbar 724 can be retracted through the support plate that spans the space between the two front legs 716, 718 directly below the gripping device 708. Once this has occurred (as in FIG. 9A), all frame elements are free to fold down against the plane of the base.

Figure 9B:
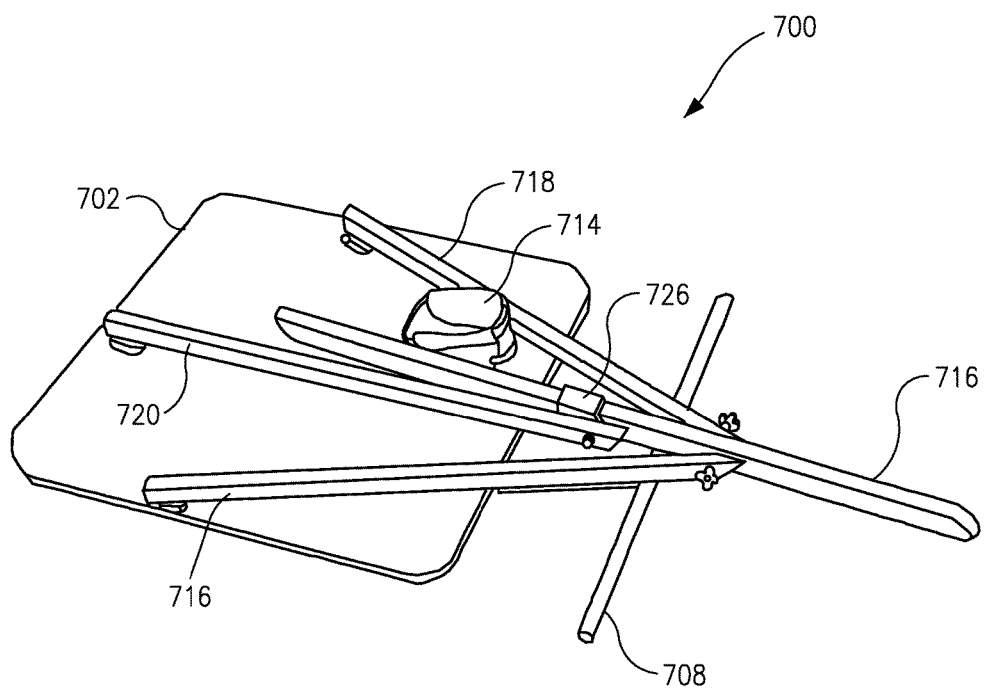
FIG. 9B is a front oblique view of the embodiment of FIG. 7 with its frame fully collapsed into the stowable position.

FIG. 9B is a front oblique view of the embodiment of FIG. 7 with its frame fully collapsed into the stowable position. The locking pin that was released from the sliding chamber 726 (thereby enabling the chamber to slide relative to the boom 716) can now be used to secure the frame to the base 702. In particular, in this embodiment the rear leg 720 will receive the locking pin, which in this case can be driven through the rear leg and into the base 702 itself. The entire embodiment is collapsed to a thin profile.

Figure 9C:
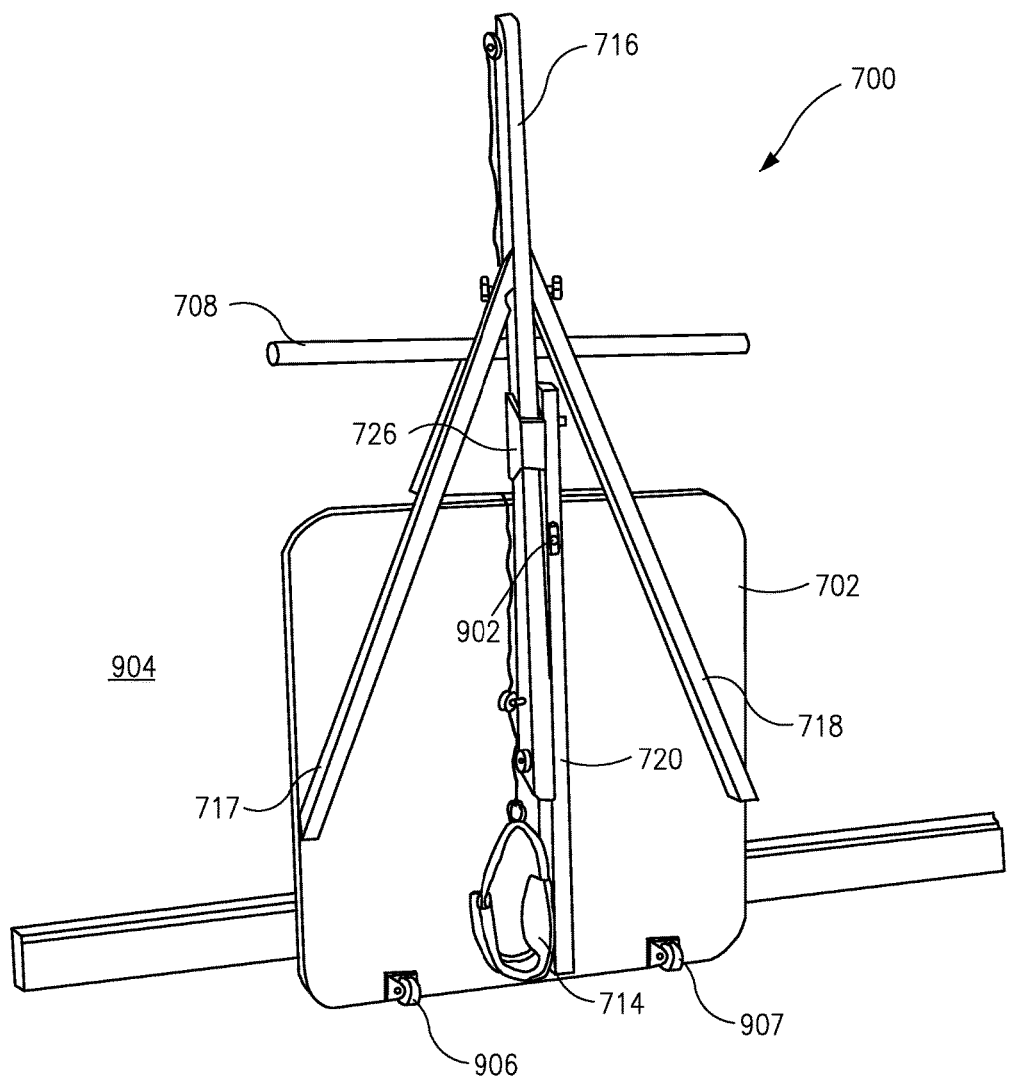
FIG. 9C is a perspective view of the embodiment of FIG. 7 having been stowed against a wall.

FIG. 9C is a perspective view of the embodiment of FIG. 7 stowed against a wall. The locking pin 902 is now shown as having been inserted into the rear leg 720 so as to secure the frame and lock it in position parallel and adjacent to the base 702. With its thin profile, this embodiment 700 offers many storage options. A frequent user may wish to simply stow it against a wall 904, for example in an exercise area. Wheels 906, 907 are shown in this embodiment as design options for easy transport. If towed by the grip bar 708, the base 702 can be supported by the collapsed frame as it is rolled.

10

FIG. 10A is a front oblique view of an embodiment of the invention including an elastic band whose tension can be adjusted along a telescoping arm. The embodiment 1000 shares many structural features of the previous embodiments such as its base, swiveling pulley, adjustable gripping device, and some aspects of its frame. However, this frame is unique in its telescoping arm for elastic resistance. This elastic resistance design is robust but also quite easily collapsible and transportable.

While certain elements shown here (such as the frame, for example) are unique to this embodiment 1000, the same functional framework of FIG. 2 is present, and achieving the same benefits here as previously discussed. The structural variations of this embodiment 1000 therefore do not depart from the essence of the inventive concept. Instead, those variations commingle with and enhance the effectiveness of the functional framework, thereby asserting and demonstrating its value even more clearly.

The embodiment shown 1000 includes a base 1002, a frame 1004 hingedly attached to and supported by the base 1002, a line-swiveling assembly 1006 coupled with the base 1002, a gripping device 1008 connected to the frame 1004, and a leaning space 1010 that allows a user to lean their upper body for full range of exercise motion during any combination of hip extension and hip abduction, while under continuous resistance from the line 1012.

The frame 1004 itself includes such sub-elements as a vertical support post 1016 connected to and supported by the base 1002, the grip support bar 1008 coupled with and supported by the support post 1016, and a telescoping elastic band arm 1020 (with an extension 1022) attached to and arising from the base 1002. The frame 1004 also includes a pulley cross arm 1018 which extends from the elastic band arm 1020 across the vertical support post 1016 and beyond, hovering above the swiveling pulley 1006.

As with earlier embodiments, the swiveling pulley 1006 engages with a resistance-transmitting line 1012, which can be pulled with an exercising leg via the lower extremity receiving device (LERD) 1014. The line 1012 is guided vertically upward from the swiveling pulley 1006 to a strategically placed frontal guiding pulley 1024 (the intermediate guiding pulley according to the functional framework) located at the front terminus of the pulley cross bar, and then guided across the frame 1004: horizontally to a rear guiding pulley 1026, located near the rear terminus of the pulley cross arm 1018.

From the rear guiding pulley 1026, the line 1012 is guided vertically upward along the telescoping arm 1020 and its extension 1022, to ultimately connect to an elastic resistance band 1028 via a connecting element, such as a ring or locking loop. The elastic resistance band 1028 itself runs around an elastic band pulley 1030 attached to an distal portion of the arm extension 1022, and then drops down to connect with an elastic band anchor 1032 (which is connected to the bottom of the telescoping arm 1020, near the base 1002).

In the embodiment shown, the telescoping arm 1020 is hingedly attached to the vertical support post 1016. The vertical support post 1016 itself is supported and locked into its vertical use-ready position by a base buttress hinge 1034. The base buttress hinge 1034 holds the vertical support post 1016 securely in the vertical position relative to a baseplate 1036, which itself is attached to the base 1002. The support post 1016 is hingedly connected to the baseplate 1036, and can be folded down when unlocked from the base buttress hinge 1034.

The frontal guiding pulley 1024, rear guiding pulley 1026, and elastic band pulley 1030, function together as a resistance-activating pulley assembly. This "band-stretching" resistance-activating pulley assembly facilitates stretching of the elastic band 1028, which is the means for generating resistance against the pulling of the resistance-transmitting line 1012. Alternative resistance-generating elements (or "resistance elements") other than an elastic band, such as liftable weight or a flexible rod a spring, and still others, will be readily apparent to or within the contemplation of one of ordinary skill in the art.

In the embodiment shown, the resistance transmitted by the line 1012 is generated by the stretching of an interchangeable elastic resistance band 1028 when the pullable end of the line 1012 is pulled with sufficient force. Unlike lifted weights, elastic bands can generate resistance that cannot be diminished via quickly accelerated motion. A combination of bands can be attached to the cable 1312 for added resistance.

A key advantage of resistance generated by an elastic band 1028 is the linear variability of its resistance. Linear variable resistance is resistance that increases in roughly linear proportion to the amount that a band has already been stretched, which many exercise enthusiasts find particularly beneficial for certain types of exercise. The reason linear variable resistance is often considered so advantageous and conducive to muscle building is that it engages muscles with greater resistance as the muscle's own strength capacity increases, requiring the greatest pulling force at the very apex of an exercise repetition.

As with earlier embodiments, various components of the frame 10044 may be adjusted. Here, the position of the gripping device 1008 can be adjusted in the vertical dimension. The height of the gripping device 1008 is controlled by a grip height adjustment system that extends the vertical support post up and down. Furthermore, the tension of a given elastic band 1028 can be adjusted by telescoping arm 1020, given how far its extension arm 1028 is projected upward.

FIG. 10B is a profile view of the embodiment of FIG. 10A. In this view, the course of the line 1012 from LERD connection, to swively pulley, 1006, to intermediate guiding pulley 1024, and ultimately to the elastic resistance connection 1028 can easily be traced. One hole of the telescopic extension 1022 can be seen to demonstrate the adjustable height of the elastic support tower.

The a connection mechanisms for the interchangeable elastic band enables quick and easy attachment to the tower base attachment 1032, and attachment to the end of the line—allowing for easy interchange of various different elastic strength units. In this view, a vertical support post hinge 1038 can be seen inside the base buttress hinge 1034, enabling the vertical support post 1016 itself to be folded down adjacent to and parallel with the base 1002. Also in view in this figure is a telescoping arm hinge 1040, which enables the telescoping arm 1020 to be folded down against the folded-down vertical support post 1016, once again parallel to the base 1002.

FIG. 10C is a front oblique view of the embodiment of FIG. 10A with its frame fully collapsed into a stowable position. The vertical support post 1016 has been folded all the way down against the top surface of the base 1002, adjacent to and parallel with it. The telescoping arm 1020 has also been folded down, adjacent to the vertical support post 1018 and also parallel with the base 1002. In this highly compact state, this embodiment 1000 can be easily stowed in a variety of different locations.

11

FIG. 11A is a front oblique view of an embodiment of the invention including an elastic band whose tension can be adjusted by a hand crank. The embodiment 1100 shares many structural features of the previous embodiments such as its base, swiveling pulley, gripping device, and some aspects of its frame. However, this frame is unique for being positioned at a rear edge of the base 1002, spanning the full width of that edge.

While certain elements shown here (such as the frame, for example) are unique to this embodiment 1100, the same functional framework of FIG. 2 is present, and achieving the same benefits here as previously discussed. The structural variations of this embodiment 1100 therefore do not depart from the essence of the inventive concept. Instead, those variations commingle with and enhance the effectiveness of the functional framework, thereby asserting and demonstrating its value even more clearly.

The embodiment shown 1100 includes a base 1102, a frame 1104 hingedly attached to and supported by the base 1102, a line-swiveling assembly 1106 coupled with the base 1102, a gripping device 1108 connected to the frame 1104, and a leaning space 1110 that allows a user to lean their upper body for full range of exercise motion during any combination of hip extension and hip abduction, while under continuous resistance from the line 1112.

The frame 1104 itself includes such sub-elements as two side support posts 1116, 1117 connected to and supported by the base 1102, a grip support bar 1108 supported by the support posts 1116, 1117, and a pulley arm 1118, which is attached to and extends from a frame cross bar 1120 that spans the space between the two support posts 1116, 1117. The frame 1104 also includes support struts 1122, 1123 to support the frame 1104 upright, and hinges 1124, 1125 for folding the frame 1104 down.

As with earlier embodiments, the swiveling pulley 1106 engages with a resistance-transmitting line 1112, which can be pulled with an exercising leg via the lower extremity receiving device (LERD) 1114. The line 1112 is guided vertically upward from the swiveling pulley 1106 to a strategically placed frontal guiding pulley 1126 (the intermediate guiding pulley according to the functional framework) located at the front terminus of the pulley arm 1118, and is then guided across the pulley arm 1118, and across the elastic band assembly.

An elastic resistance generating assembly includes a resistance-generating pulley assembly, which communicates with the resistance-transmitting line 1112, an elastic resistance band 1128 connected to the distal end of the resistance-transmitting line 1112, and finally a tension-adjusting line 1130 connected to the distal end of the elastic resistance band 1128. The tension adjusting line 1130 feeds into a hand crank which can feed the line 1130 the tension of the elastic resistance band 1128 itself.

FIG. 11B is a rear view of the embodiment of FIG. 11A. A rear guiding pulley 1132 attached horizontally to the pulley arm 1118 via a rear pulley guiding pulley housing 1134 receives the line 1112, and it is fed into the elastic resistance generating assembly, which includes two line pulleys 1140, 1141 three elastic band pulleys 1142, 1143, 1144, and a hand crank 1145 for drawing in the tension adjusting line 1130 and thereby increasing tension of the elastic resistance band 1128.

The elastic resistance generating assembly pulleys and hand crank 1145 are attached to the rear surface of the two side support posts 1116, 1117. The pulley arm 1118 is capable of turning on an axis 1136, thereby folding into the plane of the frame. For use, however, it is locked into place with a locking pin 1138. To fold the pulley arm into the frame, the locking pin 1138 can be removed. Then, the entire frame can be folded down to the base.

FIG. 11O is a front oblique view of the embodiment of FIG. 11A with its frame fully collapsed into a stowable position. The pulley arm 1118 has been folded into the plane of the side support arms 1116, 1117 and the entire frame has been folded down to be adjacent to and parallel with the base 1102. In this highly compact state, this embodiment 1100 can be stowed in a variety of different locations. It can also be carried somewhat like a suitcase, with the grip bar 1108 as a handle.

12

Figure 12A:
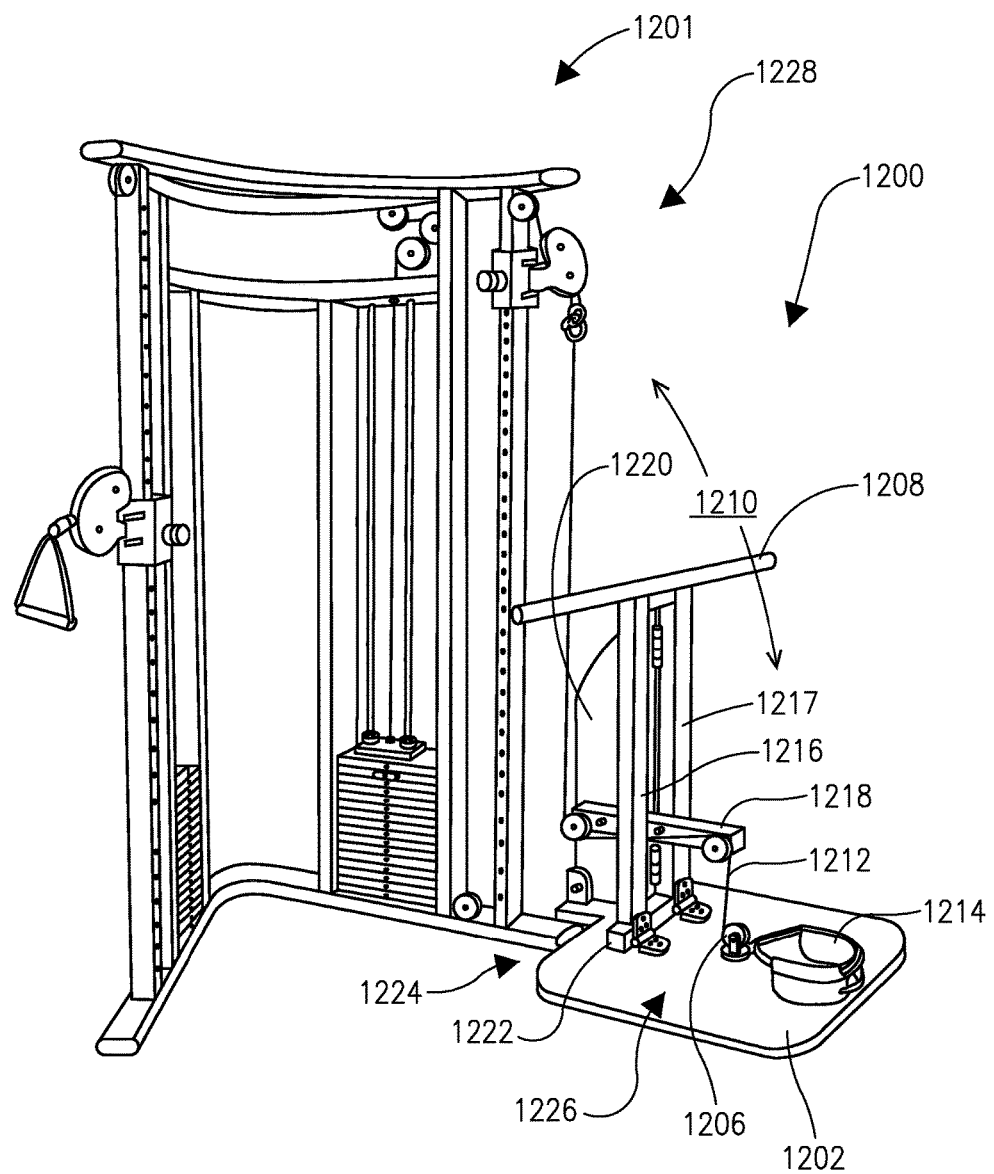
FIG. 12A is a front oblique view of an embodiment of the invention that can use the resistance of a general purpose exercise machine.

FIG. 12A is a front oblique view of an embodiment of the invention that can use the resistance of a general purpose exercise machine. The embodiment 1200 shares many structural features of the previous embodiments such as its base, swiveling pulley, gripping device, and some aspects of its frame. However, this embodiment 1200 is unique in that it does not supply its own resistance-generating element or resistance-transmitting line, but rather incorporates those of another machine 1201

While certain elements shown here (such as the frame, for example) are unique to this embodiment 1200, the same functional framework of FIG. 2 is present, and achieving the same benefits here as previously discussed. The structural variations of this embodiment 1200 therefore do not depart from the essence of the inventive concept. Instead, those variations commingle with and enhance the effectiveness of the functional framework, thereby asserting and demonstrating its value even more clearly.

The embodiment shown 1200 includes a base 1202, a frame 1204 hingedly attached to and supported by the base 1202, a line-swiveling assembly 1206 coupled with the base 1202, a gripping device 1208 connected to the frame 1204, and a leaning space 1210 that allows a user to lean their upper body for full range of exercise motion during any combination of hip extension and hip abduction, while under continuous resistance from the line 1212.

The frame 1204 itself includes such sub-elements as two support posts 1216, 1217 hingedly connected to and supported by the base 1202, a grip support bar 1208 supported by the support posts 1216, 1217, and a pulley cross arm 1218, which is attached to the right support post 1217. The frame 1204 also includes a support wing 1220 hingedly attached to the right support post 1217, which can help counter torque that is generated by the load-bearing line 1212 running off-center on the base 1202.

The support posts 1216, 1217 are connected via a bottom supportive crossbar 1222, which stands on the base 1202 and supports the frame 1204 in its upright and use-ready state, but which lifts off the base when the frame 1204 is folded down. A base cutout 1224 enables the embodiment 1200 to get close to a neighboring machine 1201 whose own cable connects to the line 1212, and its associated liftable weight, while hinges 1226 enable the frame 1204 to fold down or be lifted upright.

As with earlier embodiments, the swiveling pulley 1206 engages with a resistance-transmitting line 1212 that can be pulled with an exercising leg via the lower extremity receiving device (LERD) 1214. The line 1212 is guided vertically upward from the swiveling pulley 1206 to a strategically placed frontal guiding pulley (the intermediate guiding pulley according to the functional framework) located at the front terminus of the pulley cross bar, and then guided across the frame 1204: horizontally to a rear guiding pulley located at the rear terminus of the pulley cross arm 1218.

From the rear guiding pulley, the resistance-transmitting line 1012 is guided vertically upward. The line 1212 for this embodiment 1200 connects to a line from a neighboring machine 1201, which in this figure is a multipurpose weight machine. As the 1212 line is guided upward from the embodiment 1200 and runs into a new line, the new line encounters a sliding pulley 1228 which is capable of sliding up and down a vertical track. From there, the line 1212 is fed through a pulley assembly and down to liftable weight.

The embodiment shown 1200 enhances the exercise options of the multipurpose machine 1201. If a user tried performing hip extension and/or hip abduction with the multipurpose machine 1201 itself, they not have a grip to enable tripod posture, nor would they have the space to lean forward during hip extension. Unable to execute the proper posture during hip extension, a user would naturally flex their knee and engage their hamstring, at the expense of the gluteal muscles.

Furthermore, hip abduction would be just as severely compromised without a true gripping device that a user could grasp to counter the torque created on their body from their abducting leg. In both of these cases, the multipurpose machine 1201 would not provide an optimal gluteal exercise experience. When the multipurpose machine 1201 is supplemented with the present embodiment 1200, however, great value is added to the user's gluteal exercise repertoire, with such a lightweight device.

Figure 12B:
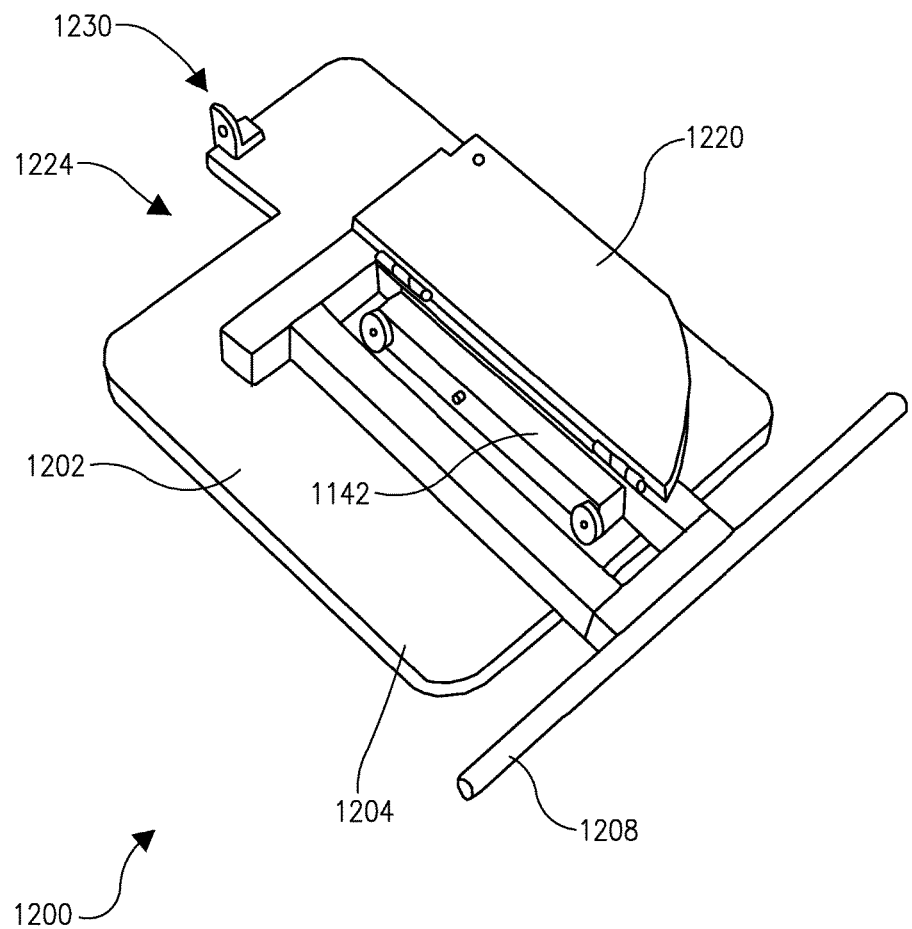
FIG. 12B is a front oblique view of the embodiment of FIG. 12A with its frame fully collapsed into a stowable position.

FIG. 12B is a front oblique view of the embodiment of FIG. 12A with its frame fully collapsed into a stowable position. The pulley arm 1218 has been folded into the plane of the support arms and the entire frame has been folded down to be adjacent to and parallel with the base 1102. The support wing 1220 has been folded away from its stopper 1230 and down against the rest of the frame and the base 1202. In this highly compact state, this embodiment 1100 can be stowed discreetly in a variety of different locations.

The dedicated purpose of this machine would also be served well by other designs: especially, for example, a T-frame configuration such as that shown and described below in relation to FIGS. 13 and 14. In the frame of those embodiments, the frame element supporting the pulleys is also bolstered by a buttress wing that rises from the base and spans the distance across the grip-swivel separation. The T-configuration further includes a broad anti-rotation mast which also rises from the base and runs along the grip axis, supporting the gripping device about a foot across on center, to absorb and neutralize torque force during exercise. This T-configuration thus provides enhanced strength and stability, relative to its modest size and weight, and small standing footprint.

13

Figure 13A:
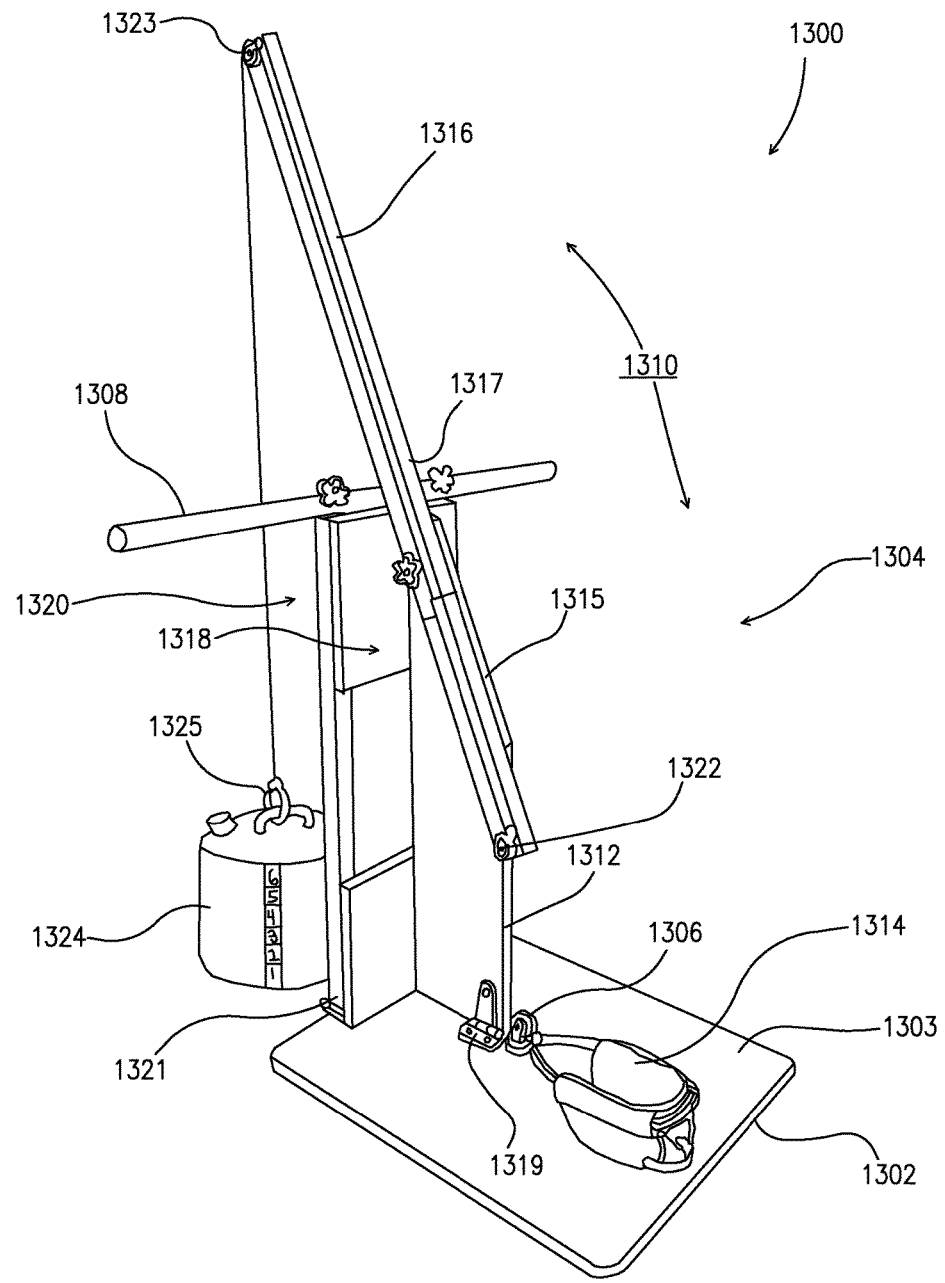
FIG. 13A is a front oblique view of an embodiment of the invention with a compact and robust T-configuration frame support.

FIG. 13A is a front oblique view of an embodiment of the invention with a compact and robust T-configuration frame support. The embodiment 1300 shares many structural features of the previous embodiments such as its base, swiveling pulley, gripping device, and some aspects of its frame. However, this frame is unique in its T-shaped support structure, which provides substantial strength, stability and overall robustness even for such a small footprint area.

While certain elements shown here (the frame configuration, for example) are unique to this embodiment 1300, the same functional framework of FIG. 2 is present, and achieving the same benefits here as previously discussed. The structural variations of this embodiment 1300 therefore do not depart from the essence of the inventive concept. Instead, those variations commingle with and enhance the effectiveness of the functional framework, thereby asserting and demonstrating its value even more clearly.

The embodiment shown 1300 includes a base 1302, a frame 1304 hingedly attached to and supported by the base 1002, a line-swiveling assembly 1306 coupled with the base 1302, a gripping device 1308 connected to the frame 1304, and a leaning space 1310 that allows a user to lean their upper body for full range of exercise motion during any combination of hip extension and hip abduction, while under continuous resistance from a line.

As with earlier embodiments, the swiveling pulley 1306 engages with a resistance-transmitting line 1312, which can be pulled with an exercising leg via the lower extremity receiving device (LERD) 1014. The line is guided across a boom that comprises a lower portion 1315 and an upper portion 1316, these portions being capable of disassembly during collapse and stowing of the embodiment 1300. The upper boom portion 1316 can be disengaged from the frame 1304 via a knurled knob system.

The boom 1315, 1316 is supported by a robust T-shaped structure which provides enough structural strength to allow for a considerably smaller base than otherwise possible. The T-shaped support of the frame 1304 includes a trapezoidal buttress wing 1318 rising vertically from the base 1302 to support the lower boom 1315. The buttress wing 1318 is foldable about a hinge (not shown); but when deployed, is stabilized in place by a buttress lock 1319 that is hingedly attached to the base 1302.

The buttress wing 1318 is hingedly attached to a frame mast, also called a grip support mast 1320, which is a key structural component of the T-shaped frame support system. The mast 1320 is attached to the base 1302 via hinges 1321, such that they can fold together across the span of the 270° reflex angle. On the other hand, the mast 1320 locks into vertical position at 90° relative to the base when deployed for use, as shown. The mast 1320 combines with the buttress 1318 and base 1302 to produce superior strength.

In its locked position, the buttress wing 1318 runs along the base on an axis stretching from the grip support mast 1320 to the line-swiveling assembly 1306 (where the user's weight is concentrated on his standing leg during exercise). This strategic placement and position of the buttress wing 1318 provides a robust bridge between the swivel axis (also the center of mass), and the grip axis (also the center of torque)—thus preventing anterior-posterior rocking or rotation of the gripping bar 1308 during use.

The mast 1320 itself is designed to provide powerful structural integrity during use. It spans a foot in width, and is connected to the base 1302 by strong door hinges. The mast 1320 also includes anti-rotation plates which absorb torque force generated by the user and prevent rotation of the grip bar 1308. Meanwhile, the buttress wing 1318 prevents movement of the bar 1308 through the user's Sagittal plane. Plywood and key metal connectors all make for a lightweight yet highly robust overall frame 1304.

The resistance-transmitting line 1312 is guided across the frame 1304 as follows: it ascends from the swiveling pulley 1306 to a strategically placed lower boom pulley 1322 (the intermediate guiding pulley of the functional framework) at the bottom of the lower boom portion 1315 and is guided diagonally upward along the boom 1315, 1316 to an upper boom pulley 1323 at the top of the upper boom portion 1316. From there, the line 1312 drops vertically to connect to a container of water 1324 via a locking clip 1325.

The pair of boom pulleys 1322, 1323 together comprise a weightlifting pulley assembly. The line 1314 is a weight machine cable configured to lift weight 1324 in cooperation with the weightlifting pulley assembly 1322, 1323 and the weight 1324 to be lifted is a container of water. This choice of adjustable weight complements the portable design of the apparatus itself. For example, the container 1324 can be designed to easily fold between the frame 1304 and base 1302 when in the collapsed state.

Figure 13B:
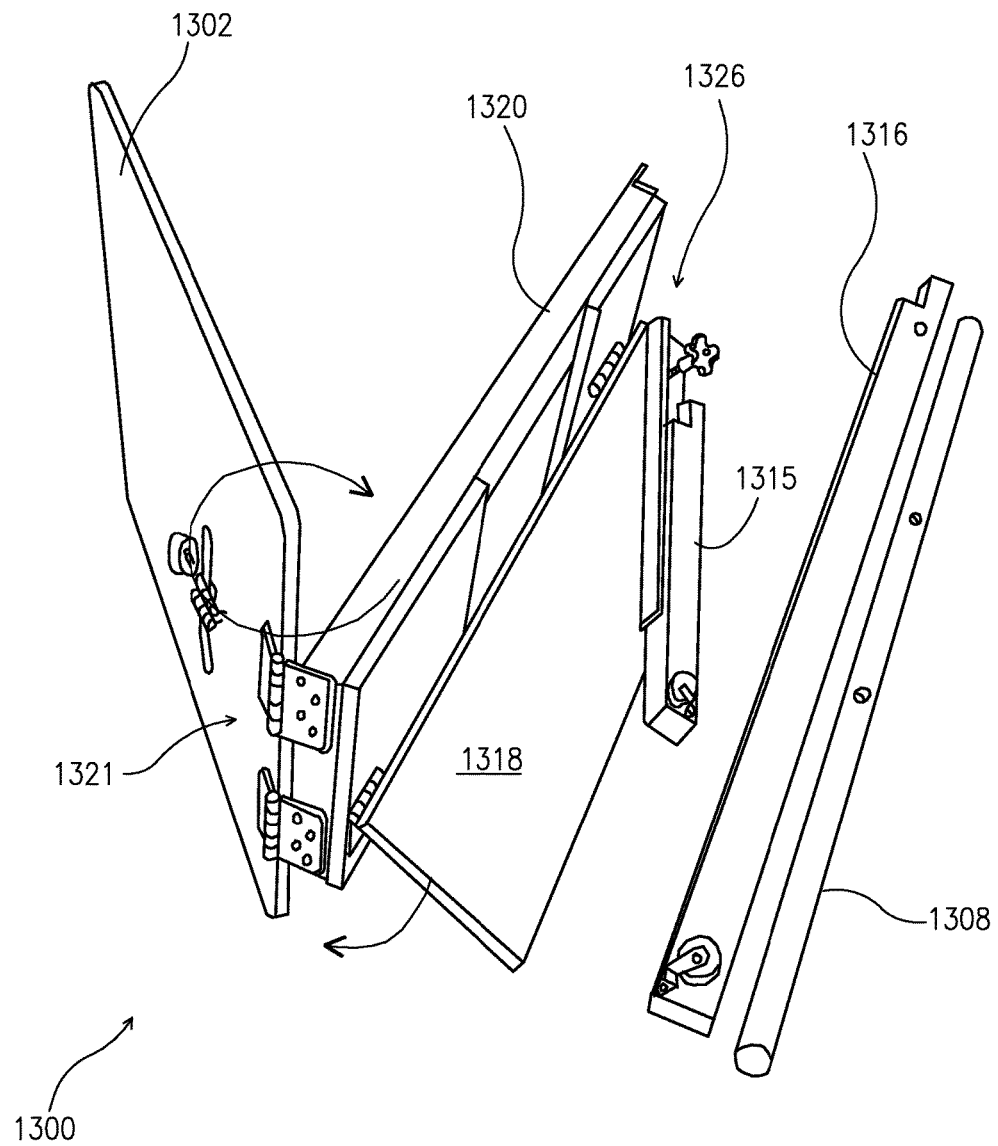
FIG. 13B is an above oblique abstract view of the embodiment of FIG. 13A that highlights its collapsible and stowable properties.

FIG. 13B is an above oblique abstract view of the embodiment of FIG. 13A that highlights its collapsible and stowable properties. This view shows how the embodiment 1300 may be collapsed into a more stowable state. It can also be viewed as an intermediate stage in preparation for either setup for use, or collapse for stowing. It is therefore just as instructive for understanding how to erect and ready the frame for use from a collapsed position, as in understanding collapse from an erected position.

It can be seen here how the buttress wing 1318 is folded against the front face of the grip support mast 1320, while the base 1302 is folded against its back face. The buttress wing 1318 is folded 90° horizontally from its position perpendicular to the mast 1320, to a collapsed state where it stands parallel and adjacent to the mast 1320. On the other hand, the base 1302 swings 270° from its own position perpendicular to the mast 1320 via hinges 1321, to finally fold flush against the backside of the mast 1320.

Also shown is a metal (steel) boom support 1326 secured to the upper diagonal edge of the trapezoidal buttress wing 1318. This boom support 1326 provides enough structural support to the boom 1315, 1316 to allow for the segmenting of the boom, which allows for separation of its portions and removal of the upper boom portion 1316 for stowing. This structural support, and allowance of boom segmentation, in turn also enables the gripping bar 1308 itself to be removed via knurled knobs for stowing.

Figure 13C:
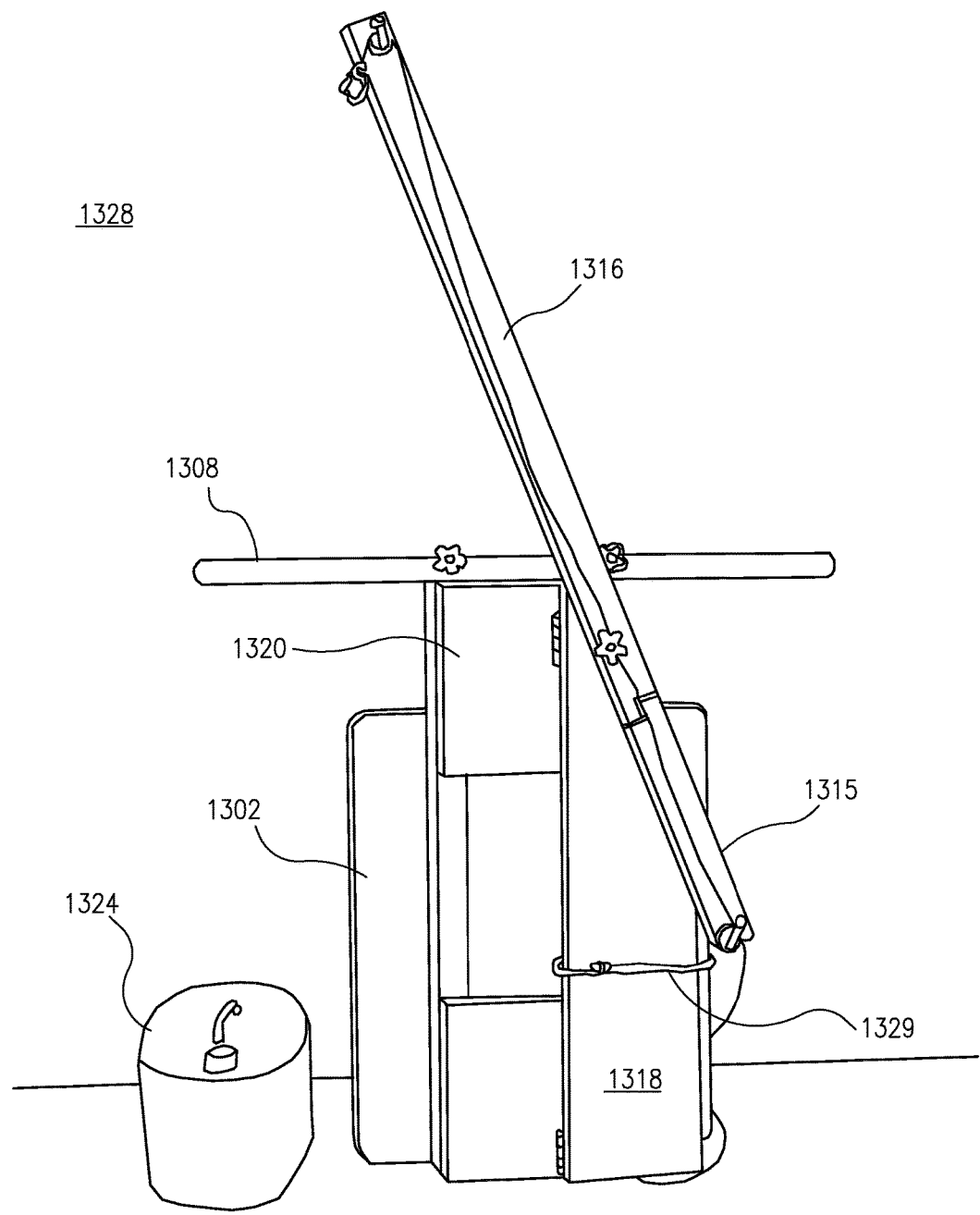
FIG. 13C is a front view of the embodiment of FIG. 13A in a partially collapsed state and stowed against a wall.

FIG. 13C is a front view of the embodiment of FIG. 13A in a partially collapsed state and stowed against a wall. With its thin profile, this embodiment 1300 offers many storage options. In this example, the embodiment 1300 has been partially collapsed, rather than fully collapsed. A frequent user may wish to simply stow it against a wall 1328, for example in an exercise area, so as to minimize the time and effort required to alternatively collapse and redeploy it for repeated stowing and use, respectively.

As shown, the buttress wing 1318 and the base 1302 have both been folded against (the front and back faces, respectively, of) the grip support mast 1320. The resulting collapsed frame has been secured in its folded state via a hooked elastic cord 1329, such as a bungee cord. The water weight 1324 has been disconnected from the line, but the upper boom portion 1316 has not been disconnected from the lower boom portion—nor has the gripping bar 1308 been disconnected from the mast 1320.

Figure 13D:
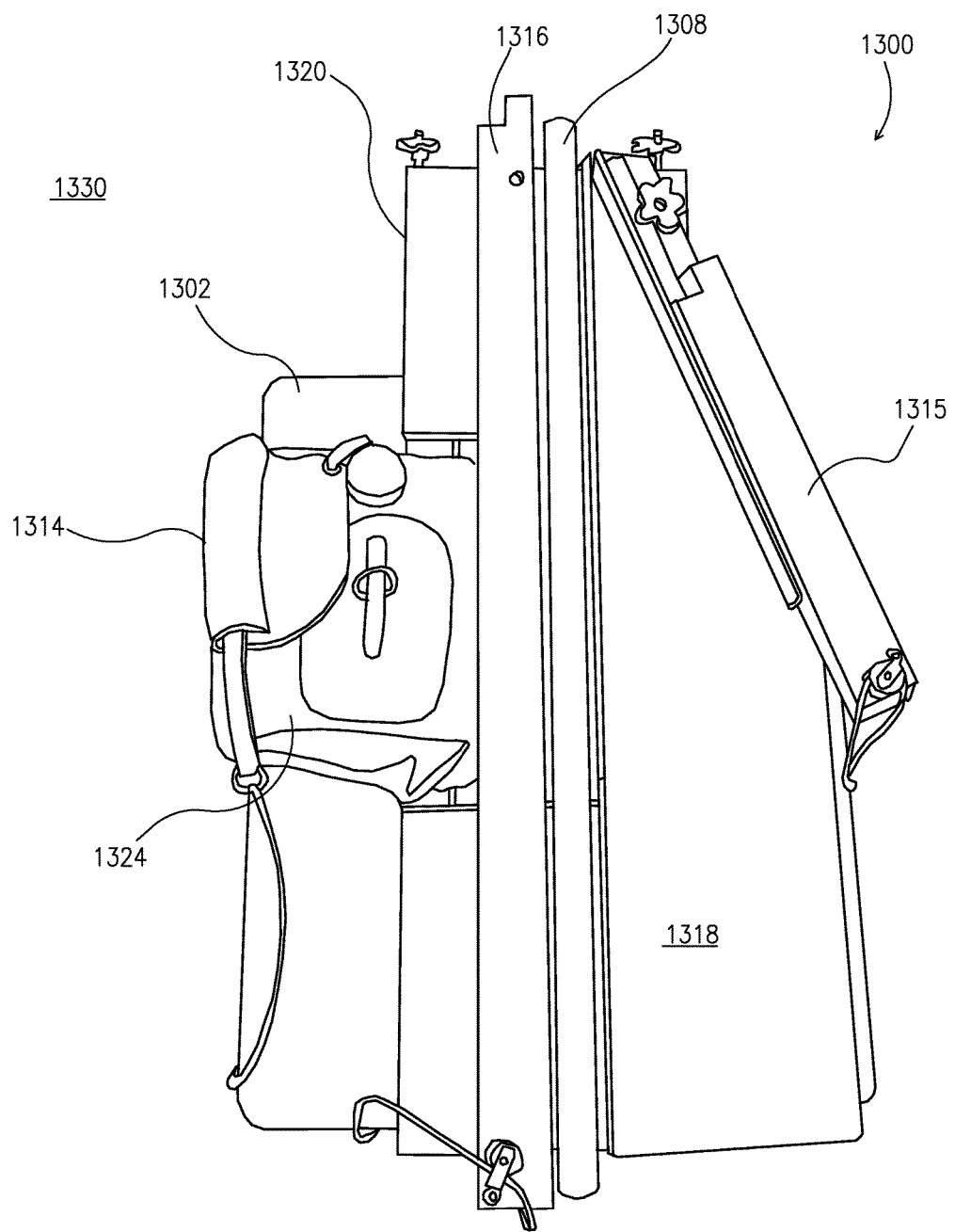
FIG. 13D is a top view of the embodiment of FIG. 13A fully collapsed into its most compact stowable state.

FIG. 13D is a top view of the embodiment of FIG. 13A collapsed into its most compact stowable state. Whereas the partial collapsed state of FIG. 13C may be desirable for frequent use in an area dedicated to exercise, full collapse on the floor 1330 can be stowed discreetly in narrow spaces, such as under a bed. Due to the strength of the frame, the base on this embodiment 1300 is able to be designed with an appreciably small footprint, enhancing its compactness even further.

In this view, the upper boom portion 1316 has been separated from the lower boom portion 1315, and the grip bar 1308 has also been removed from the mast 1320. As with the view of FIG. 13C, the buttress wing 1318 has been folded against the front face of the grip bar mast 1320, and the base 1302 folded against the back face of the grip support mast 1320. The water container 1314 and lower extremity receiving device 1314 have also been collapsed and stowed with the collapsed frame itself.

The embodiment described here 1300 satisfies key objectives of the functional framework, in an exceptional manner. Strong plywood frame elements combine with strategically chosen metal functional design elements, to provide especially strong stabilization of the grip bar 1308 during use, coupled with an especially small standing footprint and a light and compact folded configuration. With the user's body weight centered on the base, the embodiment 1300 provides superior stability for its size.

14

Figure 14A:
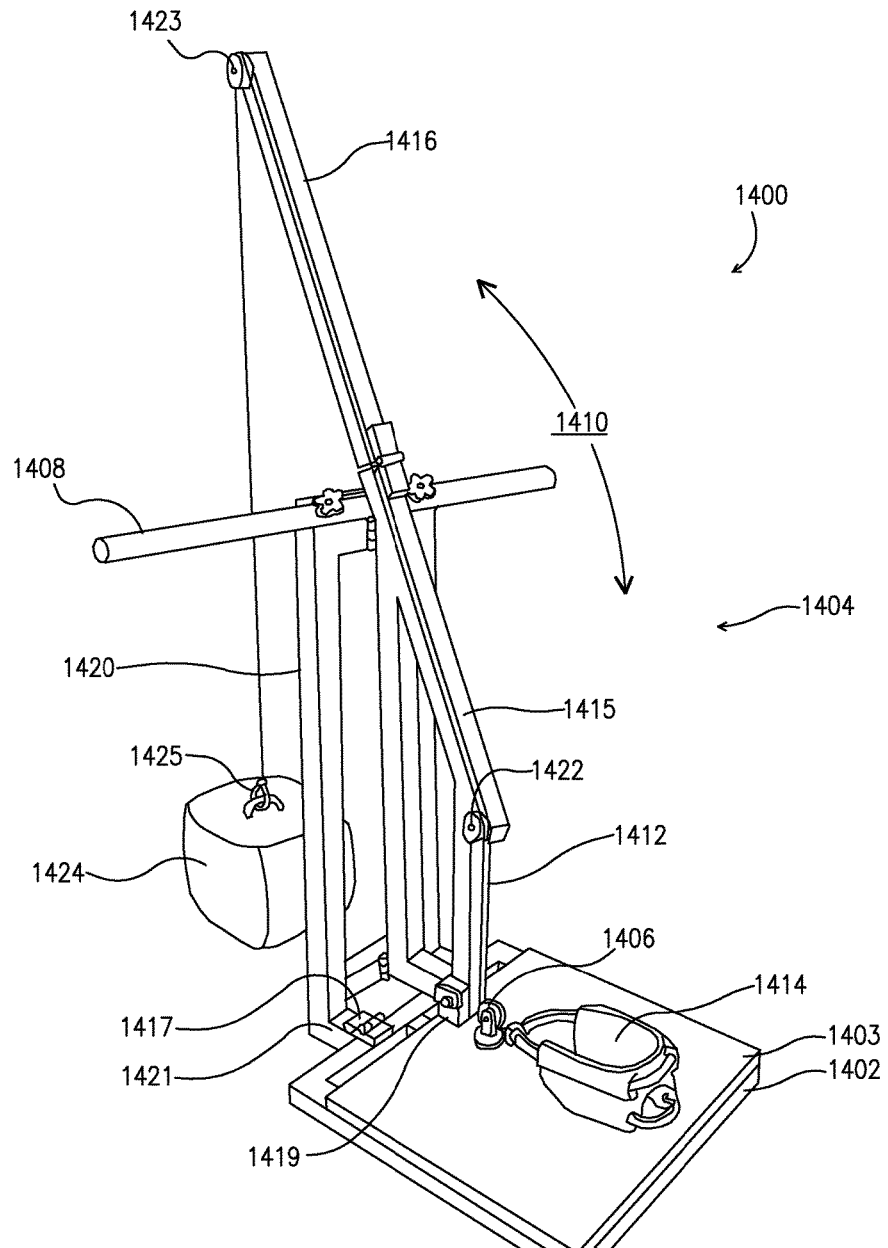
FIG. 14A is a front oblique view of an embodiment of the invention with a highly compact and robust T-configuration frame support.

FIG. 14A is a front oblique view of an embodiment of the invention with a highly compact and robust T-configuration frame support. The embodiment 1400 shares many structural features of the previous embodiments such as its base, swiveling pulley, gripping device, and some aspects of its frame. The support structure of its frame in particular bears strong resemblance to the support structure of embodiment 1300.

While the specific frame configuration shown here is unique to this embodiment 1400, the same functional framework of FIG. 2 is present, and achieving the same benefits here as previously discussed. The structural variations of this embodiment 1400 therefore do not depart from the essence of the inventive concept. Instead, those variations commingle with and enhance the effectiveness of the functional framework, thereby asserting and demonstrating its value even more clearly.

The embodiment shown 1400 includes a base 1402 and base deck 1403, a frame 1404 hingedly attached to and supported by the base 1402, a line-swiveling assembly 1406 coupled with the base 1402, a gripping device 1408 connected to the frame 1404, and a leaning space 1410 that allows a user to lean their upper body for full range of exercise motion during any combination of hip extension and hip abduction, while under continuous resistance from a line.

Both the base 1402 and frame 1404 of this embodiment contain strong metal skeletons that are highly robust. This allows for a powerful structural design that is capable not only of providing the utmost stability during exercise, but also of supporting an extremely narrow footprint when collapsed for stowing. By providing such tight and streamlined structural support, the skeleton enables an upright stowing configuration that is just as stable in its stowed state as the deployed apparatus is during use.

The base deck 1403, which can be given a texture coat or finish, in some embodiments. In addition to the metal skeleton of the base 1402 and frame 1404, the current embodiment 1400 can also include certain key wood elements. For example, the gripping device 1408 of the frame 1404 is a wooden bar in the style of a ballet bar. Such inclusion of wood can lend an organic feel to the design that is reminiscent of a ballet studio (in this case, a ballet bar), while also being lighter than metal elements.

As with earlier embodiments, the swiveling pulley 1406 engages with a resistance-transmitting line 1412, which can be pulled with an exercising leg via the lower extremity receiving device (LERD) 1414. The line is guided across a boom that comprises a lower portion 1415, and an upper portion 1416 that is capable of folding against the lower portion 1415 about a hinge 1417, during collapse and stowing.

The boom 1315, 1316 is supported by a robust T-shaped structure which provides enough structural strength to allow for a considerably smaller base than otherwise possible. The T-shaped support of the frame 1404 includes a trapezoidal buttress wing 1418 rising vertically from the base 1402 to support the lower boom 1415. The buttress wing 1418 is foldable about a hinge; but when deployed, is stabilized in place by a buttress lock 1419 that is hingedly attached to the base 1402.

The buttress wing 1418 is hingedly attached to a frame mast, also called a grip support mast 1420, which is a key structural component of the T-shaped frame support system. The mast 1420 is connected to the base 1402 via a pair of support feet 1421 that are hingedly attached to the base 1402. The support feet 1421 enable the base 1402 to be folded vertically against the mast 1420 and supported in a free-standing collapsed state. The mast 1420 combines with the buttress 1418 and base 1402 to produce superior strength.

In its locked position, the buttress wing 1418 runs along the base on an axis stretching from the grip support mast 1420 to the line-swiveling assembly 1406 (where the user's weight is concentrated on his standing leg during exercise). This strategic placement and position of the buttress wing 1418 provides a robust bridge between the swivel axis (also the center of mass), and the grip axis (also the center of torque)—thus preventing anterior-posterior rocking or rotation of the gripping bar 1408 during use.

The mast 1420 itself is designed to provide powerful structural integrity during use. It spans a foot in width, and is connected to the base 1402 by support feet 1421 and welded hinges. Its strong metal composition absorbs torque force generated by the user and prevents rotation of the grip bar 1408. Meanwhile, the buttress wing 1418 prevents movement of the bar 1408 through the user's Sagittal plane. Metal frame components make for a highly robust overall frame 1404 capable of a free-standing collapsed state.

The resistance-transmitting line 1412 is guided across the frame 1404 as follows: it ascends from the swiveling pulley 1406 to a strategically placed lower boom pulley 1422 (the intermediate guiding pulley of the functional framework) at the bottom of the lower boom portion 1415 and is guided diagonally upward along the boom 1415, 1416 to an upper boom pulley 1423 at the top of the upper boom portion 1416. From there, the line 1412 drops vertically to connect to a container of water 1424 via a locking clip 1425.

The upper boom pulley 1423 can be considered a resistance-activating pulley of the present embodiment. The resistance-activating pulley assembly of the present embodiment comprises the intermediate guiding pulley 1422 (also called a lower boom pulley in this embodiment) and the resistance-activating pulley 1423 (also called an upper boom pulley in this embodiment). This assembly is present in other disclosed embodiments as well.

The pair of boom pulleys 1422, 1423 together comprise a weightlifting pulley assembly. The line 1412 is a weight machine cable configured to lift weight 1424 in cooperation with the weightlifting pulley assembly 1422, 1423 and the weight 1424 to be lifted is a container of water. This choice of adjustable weight complements the portable design of the apparatus itself. For example, the container 1424 can be designed to easily fold between the frame 1404 and base 1402 when in the collapsed state.

Figure 14B:
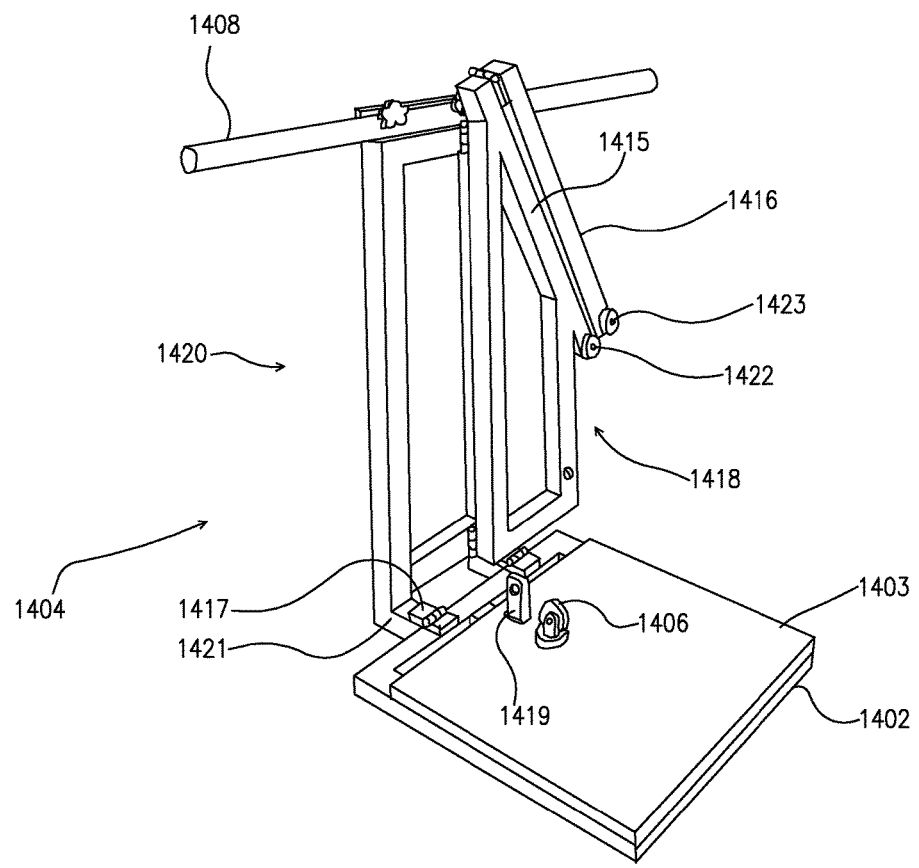
FIG. 14B is a front oblique view of the embodiment of FIG. 14A in a free-standing partially collapsed state.

FIG. 14B is a front oblique view of the embodiment of FIG. 14A in a free-standing partially collapsed state. This view shows how the embodiment 1400 may be collapsed into a more stowable state. It can also be viewed as an intermediate stage in preparation for either setup for use or collapse for stowing. It is therefore just as instructive for understanding the deploying or collapsing the embodiment 1400.

The buttress wing 1418 has been disengaged from the buttress lock 1419 and folded 90° horizontally from its position perpendicular to the mast 1420, to a collapsed state where it stands parallel and adjacent to the mast 1420. The upper boom portion 1415 has also been folded to lie flush with the lower boom portion 1416. In this collapsed state, the entire frame 1404 stands within a thin vertical profile.

Figure 14C:
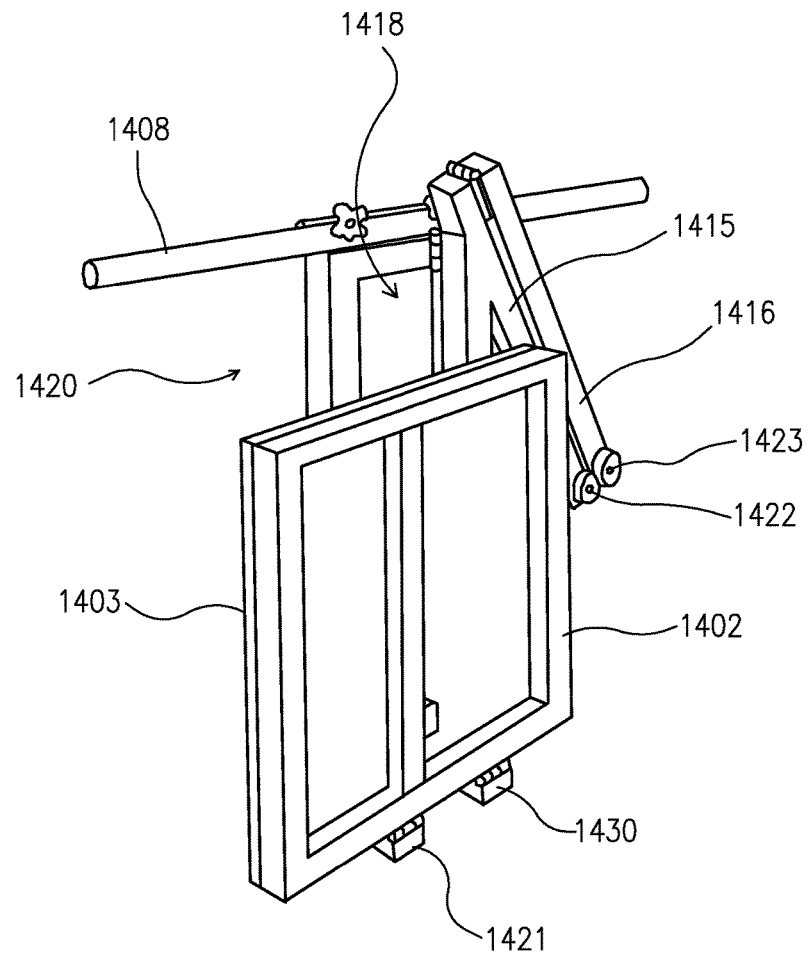
FIG. 14C is a front oblique view of the embodiment of FIG. 14A in a free-standing fully collapsed state.

FIG. 14C is a front oblique view of the embodiment of FIG. 14A in a free-standing fully collapsed state. Its thin profile offers many storage options. As shown, the base 1402 has been folded against the buttress wing 1418, which itself is folded against the grip support mast 1420. The boom has been folded in half, as its upper portion 1416 was swung about its middle hinge and brought parallel with and into contact with its lower portion. The stowed embodiment stands freely and stably in an upright position.

The strong skeleton of the frame 1404 is responsible for enabling the design that allows for such exceptionally ergonomic setup, use, and stowing. In particular, the metal support feet 1421 provide the structural support and stability for the base 1402 and the entire frame 1404 to collapse into the same vertical profile, and freely stand balanced and upright in that collapsed state. The base 1402, platform 1403 and frame 1404 were designed in harmony with, and capable of being cradled by, the support feet 1421.

In some embodiments, the feet can each include a hollow space which is capable of receiving a roller extension comprising a pair of wheels. For example, the roller extension can include a pair of inserters whose proximal ends can be inserted into the hollow feet, the inserters joined by a crossbar. The inserters can extend beyond the crossbar, each of them having a wheel at their respective distal ends. Once fully inserted, the roller extension can be used to wheel the embodiment 1400 for easy transport to the desired location for stowing and/or use.

By tilting the gripping device 1408 in the horizontal direction of the distal end of the roller extension, the distal end of the roller extension itself will tilt downward, thereby inducing the wheels to press into the ground and lifting the feet off the ground. The entire apparatus 1400 can then easily be wheeled to the desired location for stowing and/or use. When no longer in use, the roller extension can then be stowed against the underside of the base, via Velcro for example.

The embodiment described here 1400 satisfies key objectives of the functional framework, in an exceptional manner. Strong metal skeleton elements combine with strategically chosen wood functional design elements, to provide especially strong stabilization of the apparatus during use—coupled with an extremely narrow and fully stable standing footprint that makes for a highly compact upright folded state. This design thus offers a premium experience for both exercise and stowing.

CONCLUSION

The above disclosure teaches certain specific embodiments which include a frame capable of collapsing into a position substantially adjacent to and parallel with the base. However, other stowable apparatus configurations will be readily apparent to one of ordinary skill in the art. For example, the frame of some stowable apparatuses may collapse into a position that is substantially compact and advantageous for stowing, but nonetheless may not necessarily be substantially adjacent to and parallel with the base.

In achieving its compact state, the frame of the apparatus can be collapsed by a variety of possible means, or a combination thereof. For example, components of the frame may fold relative to each other, and/or even separate from each other, as in the case of foldable or sectional legs and/or boom, for instance. Foldable components can be connected to each other via hinges, as one possible example. Sectional components can be connectable for use and potentially even connectible for storage as well.

Frame and/or other components can potentially be connected or fixed into their appropriate spatial relationship by being locked into their relative to each other, via such means as threaded connectors, screwing components, vices or clamps, knurled knobs, snap-lock connectors, pin-and-holes locking mechanisms, and/or any other locking means contemplated by one of ordinary skill in the field. Frame components can also be telescoped relative to each other, for adjustment and/or storage purposes.

Other features may help maximize stowability and/or portability of the apparatus. In some preferred embodiments the profile of the apparatus in its collapsed state can be narrow enough for stowing in narrow spaces, such as under a bed. Strategically-placed wheels can help portability for female users, as can lightweight design. A "stand-on base" design can aid in apparatus stability for lightweight designs, wherein a user's body weight applied to the top surface of the base is used to facilitate stability during use.

The frame itself can include any of a wide variety of potential support structures. For example, the support may simply consist of a single vertical support post attached to the base near the swivel. Alternatively, the frame may include a pair of posts, such as may be placed at the rear of the base. In other embodiments, a tripod configuration may be used; while in still other designs, a T-frame may be used. Each choice may have its own unique trade-offs as to strength, weight, and/or other considerations.

The apparatus itself need not be accompanied by a resistance line or resistance element, though it is indeed capable of accommodating resistance. In some cases, the apparatus may hijack a line and/or resistance from a separate apparatus; in other cases the apparatus can include its own resistance. A water weight may be desirable for cable embodiments given its easy portability. Designs that enable elastic resistance may allow for compound resistance. Some embodiments may allow for tension adjustments.

The apparatus disclosed herein combines key elements in a uniquely advantageous arrangement to accomplish a specific function. Its frame is capable of collapsing into a stowable position as taught and described. Other modifications and implementations of the invention will occur to one of ordinary skilled in the art, without departing from the spirit and the scope of the invention. Thus, the above description is not intended to limit the invention except as indicated in the following claims.

What is claimed is:

1. A stowable lower body fitness apparatus, comprising:
    a base;
    a frame coupled to and supported by the base, the frame being configured to be collapsible into a stowable position;
    a line-swiveling pulley coupled with the base, the line-swiveling pulley being configured to engage with an inelastic resistance-transmitting line, to enable a pullable end of the line to swivel about a vertical swivel axis to allow a user to pull the pullable end with an exercising leg to perform full range of exercise motion for any combination of hip extension and hip abduction at maximal muscle engagement, from a single standing position that substantially straddles that swivel axis;
    a gripping device connected to the frame, the gripping device including a plurality of grippable areas positioned along a substantially horizontal grip locus,
        the grip locus being of sufficient span, and sufficient position, relative to the swivel axis to allow the user to stabilize themselves in a tripod posture formed by both arms and a standing leg during the full range of exercise motion for any combination of hip extension and hip abduction at maximal muscle engagement from the single standing position; and
    a resistance-activating pulley assembly adapted to guide the line in a horizontal portion of its pathway, from the swivel axis toward the grip locus, to facilitate engagement of the line with a resistance element while preserving leaning space, the leaning space passing from a location of the standing position through the swivel axis and over the grip locus to an opposite side of the quip locus relative to the swivel axis, the leaning space having sufficient volume to allow the user to lean their upper body opposite their exercising leg to achieve full range of exercise motion during the any combination of hip extension and hip abduction at maximal muscle engagement from the single standing position.

2. The fitness apparatus of claim 1, wherein the frame includes a transverse arm that guides the resistance-transmitting line from a front end of the frame to a rear end of the frame via pulleys.

3. The fitness apparatus of claim 2, wherein the transverse arm is a diagonal boom that slopes upward in the direction of the rear end of the frame, routing the resistance-transmitting line away from the user's leaning space.

4. The fitness apparatus of claim 1, wherein the resistance activating pulley assembly is configured to enable the resistance-transmitting line to couple a lower extremity receiving device with the resistance element to enable full range of motion for hip extension and hip abduction exercise.

5. The fitness apparatus of claim 4, wherein the frame includes an intermediate guiding pulley, and a resistance activating pulley, in communication with each other to enable the resistance-transmitting line to couple the lower extremity receiving device with the resistance element to provide resistance for full range of motion of hip extension and hip abduction exercise.

6. The fitness apparatus of claim 1, wherein the frame includes a buttress wing configured to be secured to the base to stand perpendicular and adjacent to the grip locus, to secure the frame against torque during use.

7. The fitness apparatus of claim 6, wherein the buttress wing locks to the base at a single point for immediate stabilization of the frame for use, and unlocks for folding of the frame for stowing.

8. The fitness apparatus of claim 6, wherein the buttress wing is hingedly attached to a frame mast.

9. The fitness apparatus of claim 6, wherein the buttress wing is adapted to fold against frame mast, and the buttress wing and frame mast are adapted to then fold against the base, for stowing.

10. The fitness apparatus of claim 6, wherein the buttress wing substantially spans the horizontal distance between the gripping device and the line-swiveling pulley.

11. The fitness apparatus of claim 6, wherein a collapsible boom is attached to the buttress wing.

12. The fitness apparatus of claim 1, wherein the stowable position is substantially adjacent to and substantially parallel with the base.

13. The fitness apparatus of claim 1, wherein components of the apparatus are configured to be foldable relative to each other.

14. The fitness apparatus of claim 1, wherein components of the apparatus are configured to be separated from each other.

15. The fitness apparatus of claim 1, wherein components of the apparatus are configured to be locked into desired position relative to each other.

16. The fitness apparatus of claim 1, wherein stability of the apparatus during use is facilitated by body weight of the user on the base.

17. The fitness apparatus of claim 1, the apparatus is capable of being stowed under a bed when in the stowable position.

18. The fitness apparatus of claim 1, wherein the resistance-transmitting line is routed from its pullable end horizontally to the line-swiveling pulley at the base, then vertically upward to an intermediate guiding pulley of the resistance activating pulley assembly at a proximal end of a transverse arm, then along the transverse arm toward a rear end of the frame to a resistance activating pulley of the resistance activating pulley assembly at a distal end of the transverse arm, such that the line is configured to communicate with the resistance element to provide resistance for full range of motion of hip extension and hip abduction exercise.

19. The fitness apparatus of claim 1, wherein the apparatus is adapted to rout the line:
a) from its pullable end to line-swiveling pulley that is positioned at a front end of the apparatus in front of the gripping device, at the base; then
b) from the line-swiveling pulley upward and rearward to a rear end of the apparatus behind the gripping device, via the resistance-activating pulley assembly,
such that the line provides for both:
i) resistance from the resistance element at the rear end; and
ii) the leaning space extending continuously from the front end, over the gripping device, to the rear end, for full range of motion of any combination of hip extension and hip abduction exercise.

* * * * *